(12) United States Patent
Matsunaga

(10) Patent No.: US 12,434,691 B2
(45) Date of Patent: Oct. 7, 2025

(54) BRAKING CONTROL APPARATUS

(71) Applicant: DENSO CORPORATION, Kariya (JP)

(72) Inventor: Syogo Matsunaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 351 days.

(21) Appl. No.: 18/047,997

(22) Filed: Oct. 19, 2022

(65) Prior Publication Data

US 2023/0059051 A1    Feb. 23, 2023

Related U.S. Application Data

(63) Continuation of application No. PCT/JP2021/015067, filed on Apr. 9, 2021.

(30) Foreign Application Priority Data

Apr. 21, 2020   (JP) ................................ 2020-075255

(51) Int. Cl.
*B60W 30/09* (2012.01)
*B60W 10/18* (2012.01)
*B60W 30/095* (2012.01)

(52) U.S. Cl.
CPC ............ *B60W 30/09* (2013.01); *B60W 10/18* (2013.01); *B60W 30/0953* (2013.01); *B60W 30/0956* (2013.01); *B60W 2554/80* (2020.02)

(58) Field of Classification Search
CPC ...... B60W 10/18; B60W 10/20; B60W 30/09; B60W 30/0953; B60W 30/095; B60W 30/0956; B60W 2420/52; B60W 2510/205; G01S 13/93; G01S 13/931; G05D 1/0214; G08G 1/16
See application file for complete search history.

(56) References Cited

U.S. PATENT DOCUMENTS

| | | | |
|---|---|---|---|
| 2006/0282218 A1 | 12/2006 | Urai et al. | |
| 2008/0281521 A1* | 11/2008 | Shirato | ..................... B60T 7/22 701/301 |
| 2010/0042323 A1 | 2/2010 | Harada et al. | |
| 2012/0235853 A1 | 9/2012 | Takeuchi | |
| 2021/0114590 A1 | 4/2021 | Matsunaga | |
| 2023/0059051 A1* | 2/2023 | Matsunaga | ........... B60W 30/09 |

* cited by examiner

*Primary Examiner* — John Kwon
(74) *Attorney, Agent, or Firm* — Maschoff Brennan

(57) ABSTRACT

A braking control apparatus for controlling a braking operation for an own vehicle is configured to: acquire information on an object detected around the own vehicle; calculate, when a collision between the own vehicle and the object is predicted based on both an estimated route of the object estimated based on the acquired information on the object and an estimated route of the own vehicle, a collision range in the own vehicle at a collision timing between the own vehicle and the object or a collision range in the object at the collision timing; and control, according to a positional relationship between a predetermined braking-unrequired range in the own vehicle and the calculated collision range in the own vehicle or a positional relationship between a predetermined braking-unrequired range in the object and the calculated collision range in the object, whether to perform the braking operation for the own vehicle.

9 Claims, 14 Drawing Sheets

FIG.2
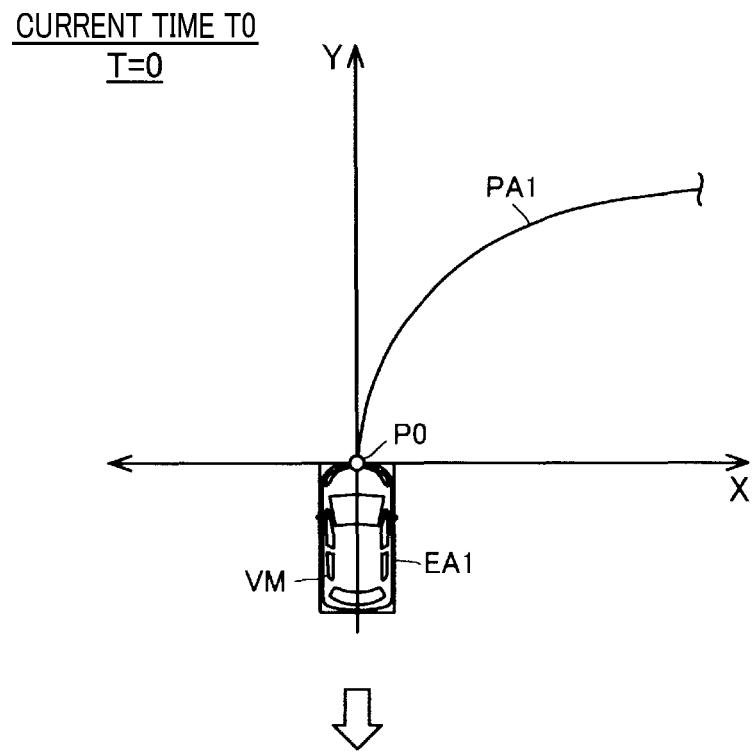
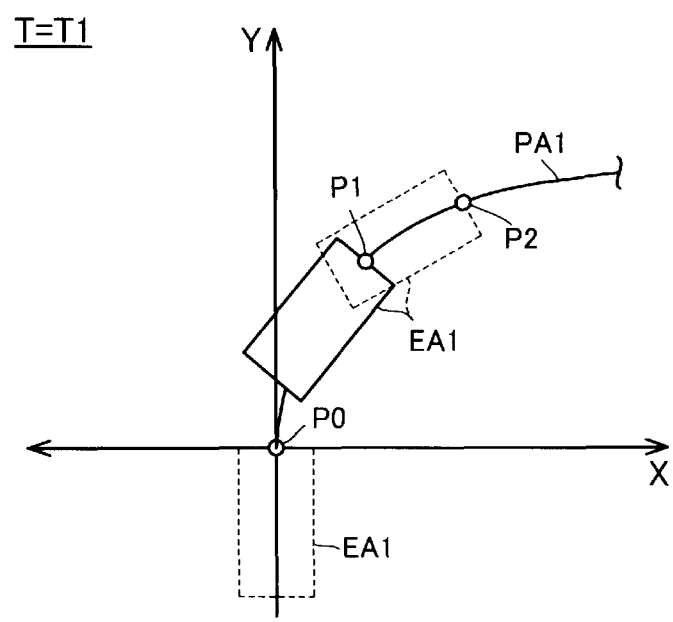

FIG.3
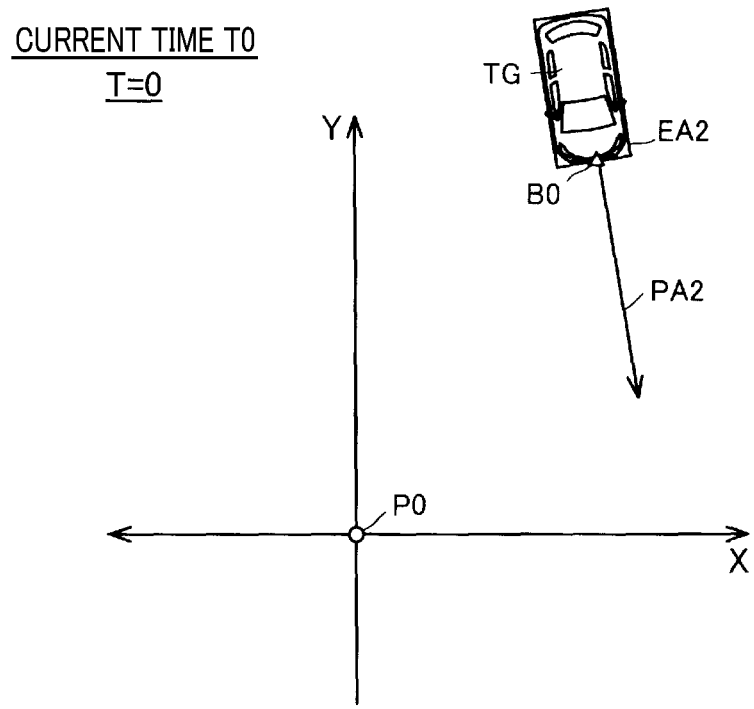
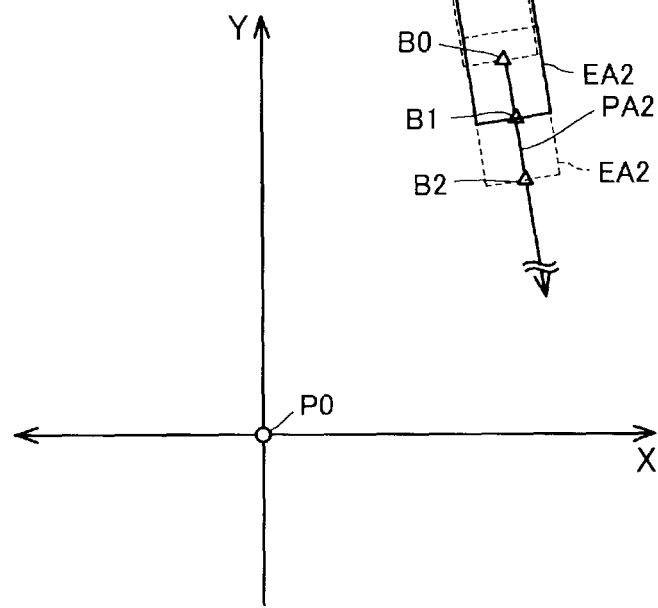

FIG.13

BRAKING CONTROL APPARATUS

CROSS-REFERENCE TO RELATED APPLICATIONS

The present application is a continuation application of International Application No. PCT/JP2021/015067 filed on Apr. 9, 2021, which is based on and claims priority from Japanese Patent Application No. 2020-075255, filed on Apr. 21, 2020. The entire contents of these applications are incorporated by reference into the present application.

BACKGROUND

1 Technical Field

The present disclosure relates to a braking control apparatus that determines whether a braking operation should be performed when there is a probability of collision between an own vehicle and an object around the own vehicle.

2 Description of Related Art

There is known a technique of: predicting both a movement path of an own vehicle and a movement path of an object around the own vehicle; determining, based on the estimated movement paths of the own vehicle and the object, whether there is a probability of collision between the own vehicle and the object; and performing, upon determination that there is a probability of collision between the own vehicle and the object, a braking operation to decelerate the own vehicle and thereby reduce the probability of collision.

SUMMARY

According to the present disclosure, there is provided a braking control apparatus for controlling a braking operation for an own vehicle. The braking control apparatus is configured to: acquire information on an object detected around the own vehicle; calculate, when a collision between the own vehicle and the object is predicted based on both an estimated route of the object estimated based on the acquired information on the object and an estimated route of the own vehicle, a collision range in the own vehicle, which includes a collision point in the own vehicle, at a collision timing between the own vehicle and the object or a collision range in the object, which includes a collision point in the object, at the collision timing; and control, according to a positional relationship between a predetermined braking-unrequired range in the own vehicle and the calculated collision range in the own vehicle or a positional relationship between a predetermined braking-unrequired range in the object and the calculated collision range in the object, whether to perform the braking operation for the own vehicle.

BRIEF DESCRIPTION OF THE DRAWINGS

FIG. 2 is an explanatory diagram of own vehicle presence regions in an XY plane of a two-dimensional coordinate system.

FIG. 3 is an explanatory diagram of target presence regions in the XY plane of the two-dimensional coordinate system.

FIG. 13 is an explanatory diagram illustrating the braking determination based on the collision range.

DESCRIPTION OF EMBODIMENTS

With the above-described technique known in the art (see, for example, Japanese Patent Application Publication No. JP 2008-213535 A and Japanese Patent Application Publication No. JP 2020-008288 A), when there is a probability of collision between the own vehicle and the object, depending on the collision situation, the probability of collision may be increased if the braking operation is performed. For example, in a collision situation where another vehicle will probably collide against a specific area at the rear end of the own vehicle, such as a trunk of the own vehicle, performing the braking operation may actually increase the probability of collision between the two vehicles. Therefore, it is desired to reduce the probability of collision even in such a collision situation.

The present disclosure has been accomplished in view of the above circumstances.

With the configuration of the above-described braking control apparatus according to the present disclosure, in a collision situation where performing the braking operation for the own vehicle may actually increase the probability of collision between the own vehicle and the object, the braking control apparatus can control the braking operation for the own vehicle to be not performed, thereby reducing the probability of collision between the own vehicle and the object. Moreover, with the use of the collision range that includes the collision point, the prediction accuracy of the collision position can be improved.

First Embodiment

Figure 1:
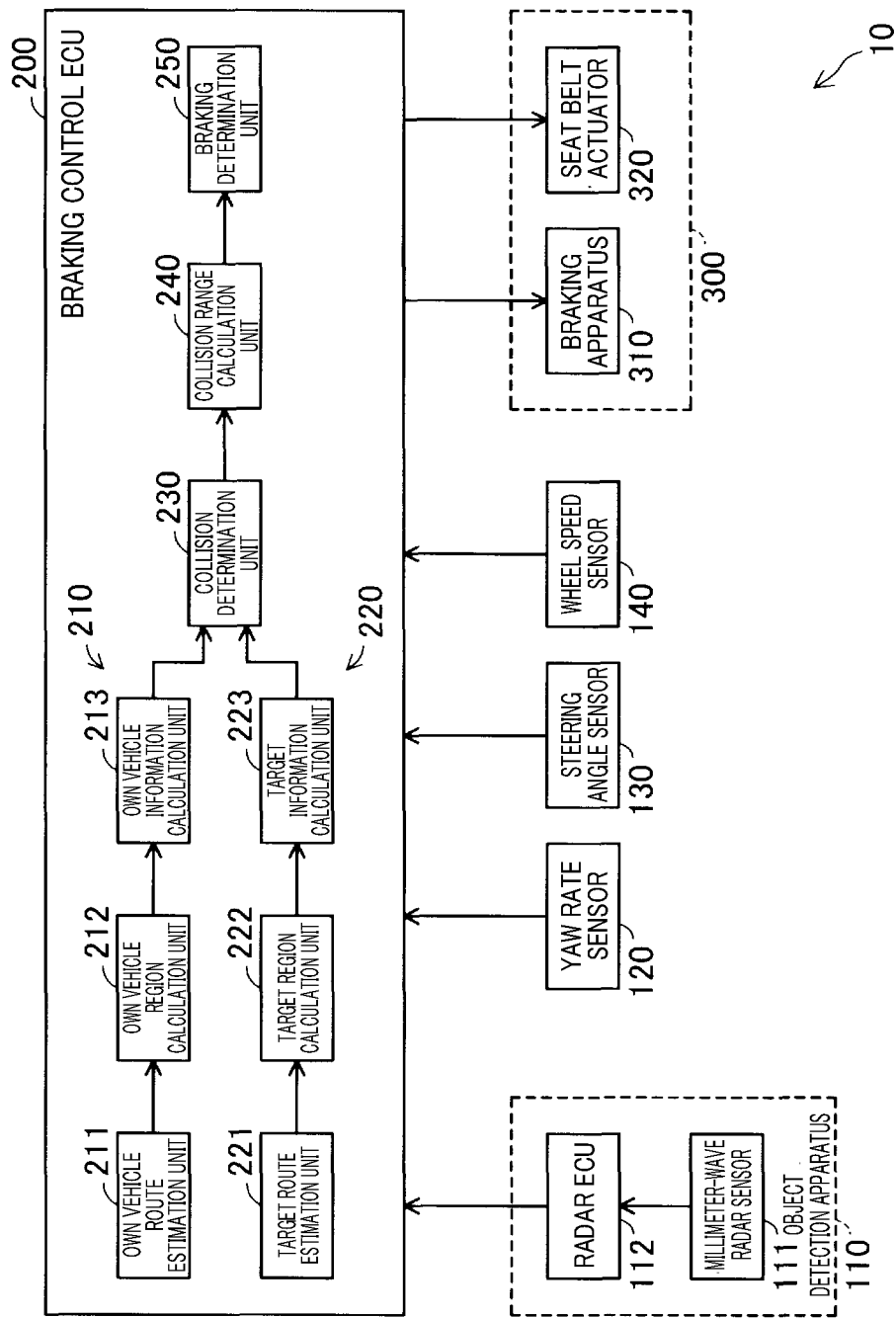
FIG. 1 is a configuration diagram of a vehicle control system.

A vehicle control system, which includes a braking control apparatus according to the present disclosure, is applied to a vehicle. The vehicle control system 10 shown in FIG. 1 includes an object detection apparatus 110 and a braking control ECU 200 that corresponds to the braking control apparatus.

The object detection apparatus 110 transmits a millimeter wave and detects, based on a reflected wave generated by reflection of the transmitted millimeter wave by an object (hereinafter, will also be referred to as "target"), both the position of the target around the own vehicle and the relative speed of the target to the own vehicle. The object detection apparatus 110 includes a millimeter-wave radar sensor 111 and a radar ECU 112.

The millimeter-wave radar sensor 111 is mounted to, for example, each of a front part and a rear part of the own vehicle. The millimeter-wave radar sensor 111 emits the millimeter wave to the surroundings of the own vehicle and receives the reflected wave. The millimeter-wave radar sensor 111 outputs, to the radar ECU 112, a reflected wave signal related to the received reflected wave.

The radar ECU 112 calculates, based on the reflected wave signal outputted from the millimeter-wave radar sensor 111, both the position of the target around the own vehicle and the relative speed of the target to the own vehicle. Further, the radar ECU 112 outputs, to the braking control ECU 200, both the calculated position of the target and the calculated relative speed of the target to the own vehicle. The radar ECU 112 is configured with, for example, a computer which includes a CPU (Central Processing Unit), a ROM (Read Only Memory), a RAM (Random Access Memory), input/output interfaces and the like. In addition, ECU is an abbreviation of Electronic Control Unit.

To the braking control ECU 200, there are connected a yaw rate sensor 120, a steering angle sensor 130, a wheel speed sensor 140 and a collision suppression apparatus 300. The yaw rate sensor 120 is provided at, for example, a central position of the own vehicle. The yaw rate sensor 120 outputs, to the braking control ECU 200, a yaw rate signal indicating the rate of change of the steering amount of the own vehicle. The steering angle sensor 130 is mounted to, for example, a steering rod of the own vehicle. The steering angle sensor 130 outputs, to the braking control ECU 200, a steering angle signal indicating the change in the steering angle of a steering wheel of the own vehicle caused by the driver's manipulation. The wheel speed sensor 140 is mounted to, for example, a wheel portion of the own vehicle. The wheel speed sensor 140 outputs, to the braking control ECU 200, a wheel speed signal indicating the wheel speed of the own vehicle.

The collision suppression apparatus 300 is an apparatus for suppressing collision of the target with the own vehicle. In the present embodiment, the collision suppression apparatus 300 includes a braking apparatus 310 and a seat belt actuator 320.

The braking apparatus 310 controls braking by a brake actuator. Specifically, the braking apparatus 310 controls the braking force of the brake actuator in accordance with a deceleration signal outputted from the braking control ECU 200. The braking force of the brake actuator is controlled to adjust the amount of deceleration of the own vehicle. The seat belt actuator 320 operates a seat belt retractor, in accordance with an activation signal outputted from the braking control ECU 200, to retract and thereby tighten a seat belt.

The braking control ECU 200 determines, based on the position of the target and the relative speed of the target to the own vehicle outputted from the object detection apparatus 110, whether the target will collide with the own vehicle. Moreover, when it is determined that the target will collide with the own vehicle, the braking control ECU 200 further determines, based on a collision range including a collision point, whether to perform a braking operation by the braking apparatus 310. Specifically, the braking control ECU 200 calculates an own vehicle solid, which is a solid indicating the change of own vehicle presence regions on an estimated route of the own vehicle, in a virtually-formed three-dimensional coordinate system. Moreover, the braking control ECU 200 also calculates a target solid, which is a solid indicating the change of target presence regions on an estimated route of the target, in the three-dimensional coordinate system; the estimated route of the target is estimated based on the position of the target and the relative speed of the target to the own vehicle outputted from the object detection apparatus 110. Then, the braking control ECU 200 determines whether the own vehicle and the target will collide with each other by determining whether the own vehicle solid and the target solid intersect each other. Further, the braking control ECU 200 calculates the collision range at a collision timing based on the position of the target presence region entering a collision determination area that surrounds the own vehicle presence region; at the collision timing, the own vehicle and the target will probability collide with each other. Then, based on the calculated collision range, the braking control ECU 200 controls whether to perform the braking operation by the braking apparatus 310. In addition, the position of the target and the relative speed of the target to the own vehicle, both of which are outputted from the object detection apparatus 110, together correspond to the "target information", i.e., the "object information".

In performing the braking operation upon determining that the target will collide with the own vehicle, the braking control ECU 200 operates the collision suppression apparatus 300 to perform collision suppression control for the own vehicle. Specifically, the braking control ECU 200 operates the collision suppression apparatus 300 to perform the collision suppression control by, for example, generating and outputting to the braking apparatus 310 the deceleration signal and generating and outputting to the seat belt actuator 320 the activation signal.

The functions of collision determination and braking control by the braking control ECU 200 are realized by functional components such as an own vehicle change calculation unit 210, a target change calculation unit 220, a collision determination unit 230, a collision range calculation unit 240 and a braking determination unit 250. Moreover, the own vehicle change calculation unit 210 is realized by an own vehicle route estimation unit 211, an own vehicle region calculation unit 212 and an own vehicle information calculation unit 213. The target change calculation unit 220 is realized by a target route estimation unit 221, a target region calculation unit 222 and a target information calculation unit 223. The braking control ECU 200 is configured with, for example, a computer which includes a CPU, a ROM, a RAM, input/output interfaces and the like. In addition, each of the above functional components is realized by the CPU executing an application corresponding to each function.

As will be described below, the own vehicle change calculation unit 210 calculates an own vehicle solid, which is a solid indicating the change of own vehicle presence regions on an estimated route of the own vehicle, in a virtually-formed three-dimensional coordinate system. Similarly, as will be described below, the target change calculation unit 220 calculates a target solid, which is a solid indicating the change of target presence regions on an estimated route of the target, in the three-dimensional coordinate system; the estimated route of the target is estimated based on the position of the target and the relative speed of the target to the own vehicle outputted from the object detection apparatus 110.

In the own vehicle change calculation unit 210, the own vehicle route estimation unit 211 calculates an own vehicle estimated route PA1, which denotes an estimated route of the own vehicle, based on both the rate of change of the steering amount of the own vehicle and the own vehicle speed. Specifically, in the present embodiment, the own vehicle route estimation unit 211 first calculates an estimated curve radius of the own vehicle based on both the yaw rate of the own vehicle calculated using the yaw rate signal outputted from the yaw rate sensor 120 and the own vehicle speed calculated using the wheel speed signal outputted from the wheel speed sensor 140. Then, the own vehicle route estimation unit 211 calculates, as the own vehicle estimated route PA1, a route of the own vehicle in the case of the own vehicle traveling along the calculated estimated curve radius. In addition, the rate of change of the steering amount of the own vehicle may be calculated using the steering angle signal outputted from the steering angle sensor 130.

The own vehicle region calculation unit 212 calculates own vehicle presence regions EA1 in an XY plane of a two-dimensional coordinate system defined by the distance Y in a current traveling direction of the own vehicle and the distance X in a vehicle width direction of the own vehicle; the own vehicle presence regions EA1 represent regions, where the own vehicle is present, at constant time intervals on the own vehicle estimated route PA1. Specifically, in the present embodiment, the own vehicle region calculation unit 212 calculates the own vehicle presence regions EA1 at respective positions on the own vehicle estimated route PA1 during the period from a current time T0 to an estimation end time TN.

In an upper part of FIG. 2, there is shown the own vehicle presence region EA1 calculated for the own vehicle VM at the current time T0, i.e., when the elapsed time T is 0. In the present embodiment, the own vehicle presence region EA1 is determined as a rectangular region that includes the entire outer periphery of the own vehicle VM in a view of the own vehicle VM from the vertically upper side. The own vehicle region calculation unit 212 determines, based on vehicle specifications indicating the size of the own vehicle, the rectangular region that forms the own vehicle presence region EA1. For example, the own vehicle presence region EA1 at the current time T0 is determined so that the intersection point (0, 0) between the X axis and the Y axis coincides with a reference position P0 of the own vehicle VM. In addition, the reference position P0 of the own vehicle VM is set to be the center in the vehicle width direction at a front end of the own vehicle.

In a lower part of FIG. 2, there is shown, in comparison with the own vehicle presence region EA1 at the current time T0 shown in the upper part of FIG. 2, the own vehicle presence region EA1 at a future time when the elapsed time T from the current time T0 is T1. In addition, in the lower part of FIG. 2, for the sake of facilitating explanation, there are also shown, by dashed lines, the own vehicle presence region EA1 at the current time T0 and the own vehicle presence region EA1 at a future time when the elapsed time T from the current time T0 is T2 (T2>T1).

The own vehicle presence region EA1 at the future time after the elapse of time T1 from the current time T0 is the region where the own vehicle VM would be present after moving for the elapsed time T1 from the own vehicle position at the current time T0 along the own vehicle estimated route PA1. For example, the own vehicle region calculation unit 212 calculates, based on the own vehicle estimated route PA1 calculated at the own vehicle position at the current time T0 and the own vehicle speed, passing positions which the own vehicle VM would pass after moving from the reference position P0 of the own vehicle VM at the current time T0 along the own vehicle estimated route PA1 for the respective elapsed times Tn (n represents values greater than or equal to 0 and less than or equal to N). Then, the own vehicle region calculation unit 212 calculates, as the own vehicle presence regions EA1 at the future times after the elapse of times Tn from the current time T0, rectangular regions where the reference positions Pn are respectively set to the passing positions. In the present embodiment, the own vehicle presence regions EA1 at the future times after the elapse of times Tn from the current time T0 are oriented respectively in the directions of tangent lines to the own vehicle estimated route PA1 at the reference positions Pn.

Figure 4:
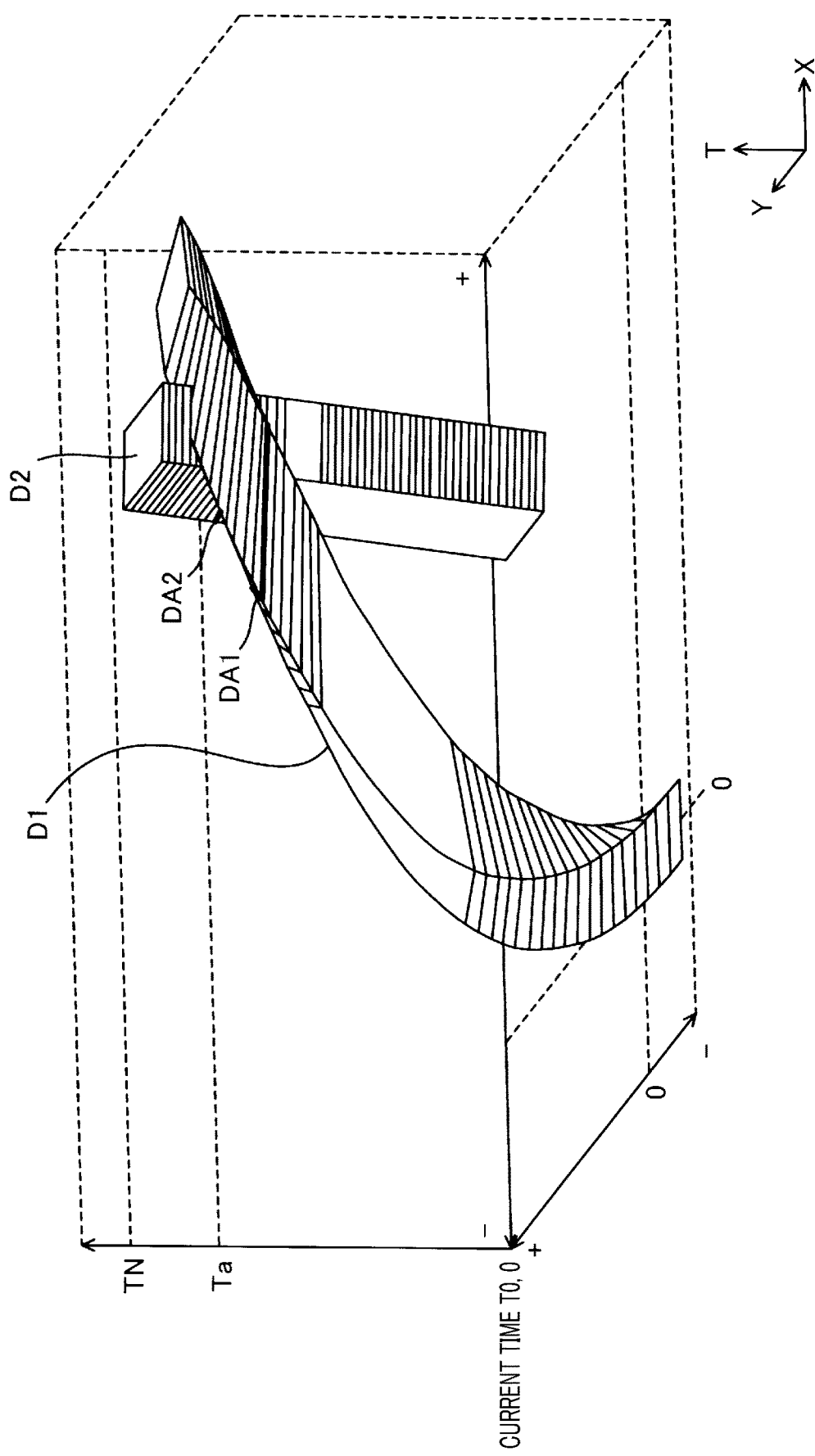
FIG. 4 is an explanatory diagram of an own vehicle solid and a target solid in a three-dimensional coordinate system.

The own vehicle information calculation unit 213 calculates an own vehicle solid D1, which indicates the change of the own vehicle presence regions EA1, by interpolating the own vehicle presence regions EA1 in a three-dimensional coordinate system defined by the distance Y in the own vehicle traveling direction, the distance X in the vehicle width direction and the elapsed time T from the current time T0. In the three-dimensional coordinate system shown in FIG. 4, the point (0, 0, 0) represents the reference position P0 of the own vehicle at the current time T0. The own vehicle solid D1 indicates the movement change of the own vehicle presence regions EA1 with the elapsed time T in the three-dimensional coordinate system. In FIG. 4, the own vehicle solid D1 is calculated for a predicted duration from the current time T0 to the estimation end time TN.

In the present embodiment, the own vehicle information calculation unit 213 converts the calculated own vehicle presence regions EA1 into information in the three-dimensional coordinate system. Then, the own vehicle information calculation unit 213 calculates the own vehicle solid D1 by linearly interpolating, in the three-dimensional coordinate system, four corners between the own vehicle presence regions EA1 adjacent to one another in the direction in which a T axis representing the elapsed time extends.

In the target change calculation unit 220, the target route estimation unit 221 calculates a target estimated route PA2, which denotes an estimated route of the target, based on the position of the target and the relative speed of the target to the own vehicle both of which are detected by the target detection apparatus 110. For example, the target route estimation unit 221 calculates a movement locus of the target based on the change in the target position detected by the object detection apparatus 110, and sets the movement locus as the target estimated route PA2. In addition, the target estimated route PA2 corresponds to the "estimated route of the object".

The target region calculation unit 222 calculates target presence regions EA2 in the XY plane of the two-dimensional coordinate system defined based on the current own vehicle position; the target presence regions EA2 represent regions, where the target is present, at constant time intervals on the target estimated route PA2. In other words, the target presence regions EA2 represent the presence regions of the target at constant time intervals when the target moves along the target estimated route PA2. In addition, the target presence regions EA2 correspond to the "object presence regions".

In an upper part of FIG. 3, there is shown the target presence region EA2 calculated for the target TG at the current time T0. The target presence region EA2 in the XY plane at the current time T0 represents the presence region of the target TG detected by the object detection apparatus 110 at the current own vehicle position. In the present embodiment, another vehicle is shown as an example of the target TG. The target region calculation unit 222 sets the target presence region EA2 as a rectangular region that includes the entire outer periphery of the target TG in a view of the target TG from the vertically upper side. For example, the rectangular region that forms the target presence region EA2 is set based on the size of the target TG calculated by the target detection apparatus 110.

In a lower part of FIG. 3, there is shown, in comparison with the target presence region EA2 at the current time T0 shown in the upper part of FIG. 3, the target presence region EA2 at the future time when the elapsed time T from the current time T0 is T1. For example, the target region calculation unit 222 calculates, based on the target estimated route PA2 and the relative speed of the target TG to the own vehicle VM, passing positions which the target TG would pass after moving from the reference position BO of the target TG at the current time T0 along the target estimated route PA2 for the respective elapsed times Tn. Then, the target region calculation unit 222 calculates, as the target presence regions EA2 at the future times after the elapse of times Tn from the current time T0, rectangular regions where the reference positions Bn are respectively set to the passing positions.

The target information calculation unit 223 calculates a target solid D2, which indicates the change of the target presence regions EA2, by interpolating the target presence regions EA2 in the three-dimensional coordinate system defined based on the own vehicle position at the current time T0. The target solid D2 shown in FIG. 4 indicates the movement change of the target presence regions EA2 with the elapsed time T in the three-dimensional coordinate system. In the present embodiment, the target information calculation unit 223 converts the calculated target presence regions EA2 into information in the three-dimensional coordinate system. Then, the target information calculation unit 223 calculates the target solid D2 by linearly interpolating, in the three-dimensional coordinate system, four corners between the target presence regions EA2 adjacent to one another in the direction in which the T axis representing the elapsed time extends. In addition, the target presence regions EA2 correspond to the "object presence regions" and the target solid D2 corresponds to the "object solid".

The collision determination unit 230 determines whether the target TG will collide with the own vehicle VM by determining whether the own vehicle solid D1 and the target solid D2 intersect each other. In the present embodiment, the collision determination unit 230 calculates, using the own vehicle solid D1, a first determination region DA1 that represents the own vehicle presence region EA1 at the set elapsed time T. Moreover, the collision determination unit 230 calculates, using the target solid D2, a second determination region DA2 that represents the target presence region EA2 at the same elapsed time T as the first determination region DA1. Then, if there is an overlapping region between the calculated first and second determination regions DA1 and DA2 at the same elapsed time T, the collision determination unit 230 determines that the own vehicle solid D1 and the target solid D2 intersect each other.

Figure 5:
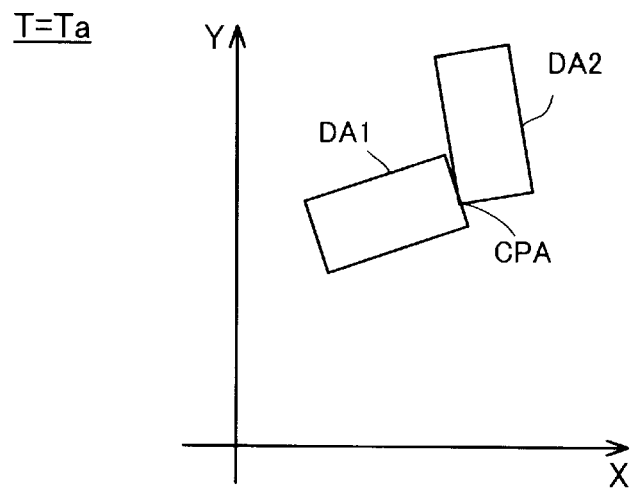
FIG. 5 is an explanatory diagram illustrating a determination, by means of the own vehicle solid and the target solid, of collision between the own vehicle and the target.

When the own vehicle solid D1 and the target solid D2 intersect each other, there is an overlapping region CPA between the first determination region DA1 and the second determination region DA2 in the XY plane at the same elapsed time Ta, as shown in FIG. 5. Therefore, when there is an overlapping region CPA between the first determination region DA1 and the second determination region DA2 at the same elapsed time T, the collision determination unit 230 determines that the own vehicle VM and the target TG will collide with each other.

On the other hand, when the own vehicle solid D1 and the target solid D2 do not intersect each other, there is no overlapping region CPA between the first determination region DA1 and the second determination region DA2 in the XY plane at any elapsed time T. Therefore, when there is no overlapping region CPA between the first determination region DA1 and the second determination region DA2 at the same elapsed time T, the collision determination unit 230 determines that the own vehicle VM and the target TG will not collide with each other.

In the present embodiment, the collision determination unit 230 repeatedly calculates, at predetermined elapsed-time intervals ΔT during the period from the current time T0 to the estimation end time TN, the first and second determination regions DA1 and DA2 at the same elapsed time T. Then, the collision determination unit 230 determines whether there is an overlapping region CPA between the calculated the first and second determination regions DA1 and DA2 at the same elapsed time T.

As will be described below, the collision range calculation unit 240 calculates, as a collision position where the target TG will probably collide with the own vehicle VM, a collision range CA that includes a collision point P, not merely the collision point P, based on the positional relationship between the own vehicle presence region EA1 and the target presence region EA2 at a collision-predicted elapsed time Ta (hereinafter, will also be referred to as "collision timing Ta"). In addition, in the present embodiment, the collision point CP and the collision range CA are a collision point and a collision range in the own vehicle VM. Moreover, as will be described later, the braking determination unit 250 controls, according to the positional relationship between the collision range CA and a predetermined braking-unrequired range in the own vehicle VM, whether to perform the braking operation for the own vehicle VM.

Figure 6:
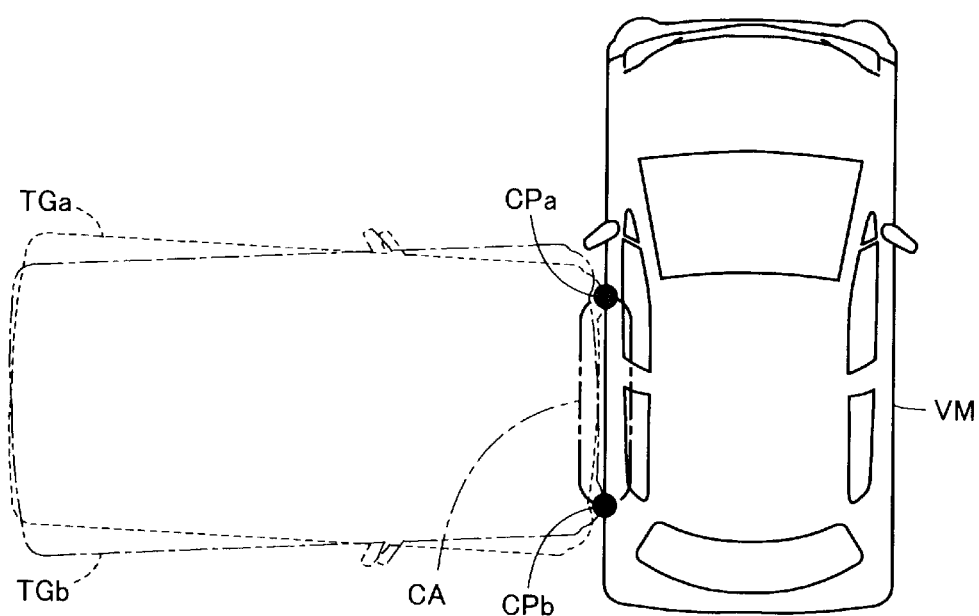
FIG. 6 is an explanatory diagram illustrating XY coordinates at the time of collision between the own vehicle and the target.

The collision range CA is used for control of the braking operation for the own vehicle VM for the following reason. As shown in FIG. 6, if the target TG is a first target TGa that is another vehicle in a state of being inclined in a first direction close to an exactly transverse direction, it will probably collide with the own vehicle VM at a first collision point CPa on the front side on a side surface of the own vehicle VM. In contrast, if the target TG is a second target TGb that is another vehicle in a state of being inclined in a direction close to the exactly transverse direction but opposite to the first direction, it will probably collide with the own vehicle VM at a second collision point CPb on the rear side of the first collision point CPa on the side surface of the own vehicle VM. Therefore, if the control on whether to perform the braking operation for the own vehicle VM was carried out according to the positional relationship between the collision point CP and the braking-unrequired range, variation in the positional relationship would be large and thus the accuracy of the control would be low. In view of the above, in the present embodiment, the collision range CA is used instead of the collision point CP, i.e., the control on whether to perform the braking operation for the own vehicle VM is carried out according to the positional relationship between the collision range CA and the braking-unrequired range NBA.

Figure 7:
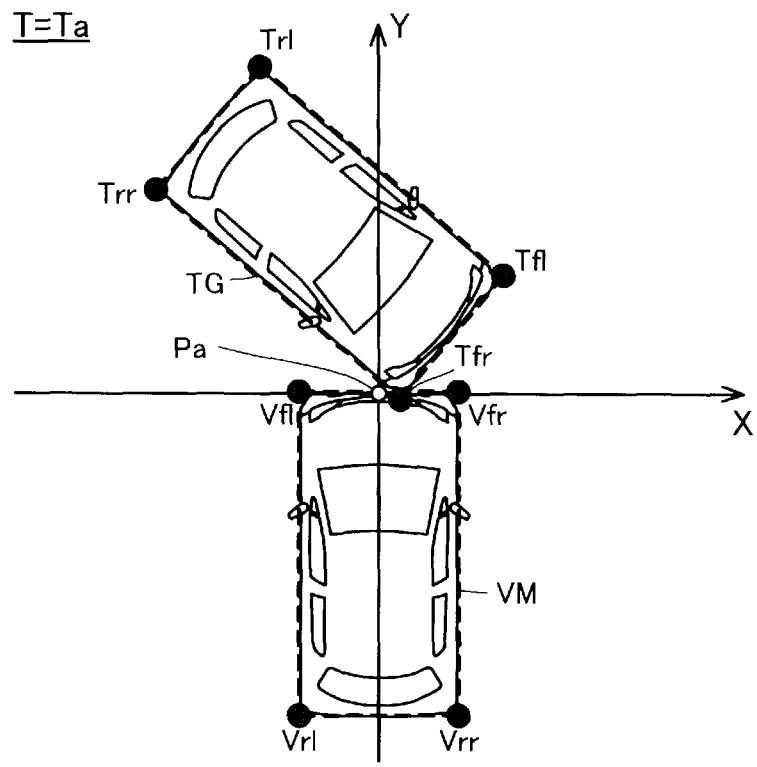
FIG. 7 is an explanatory diagram illustrating the relationship between the collision position and the collision range.

In order to specify the positions of the own vehicle presence region EA1 and the target presence region EA2 at the collision timing Ta, the collision range calculation unit 240 uses coordinates in the XY plane of the two-dimensional coordinate system defined by the distance Y in the own vehicle traveling direction and the distance X in the vehicle width direction as shown in FIG. 7. The XY plane shown in FIG. 7 is defined such that the reference position Pa of the own vehicle VM at the collision timing Ta is set to the intersection point (0, 0) between the X axis and the Y axis. The own vehicle presence region EA1 and the target presence region EA2 at the collision timing Ta can be represented by the coordinates of the positions in the defined XY plane. Specifically, the position of the own vehicle presence region EA1 can be represented by the coordinates of four corner points including a left-front corner point Vfl, a right-front corner point Vfr, a left-rear corner point Vrl and a right-rear corner point Vrr in the defined XY plane. Similarly, the position of the target presence region EA2 can be represented by the coordinates of four corner points including a left-front corner point Tfl, a right-front corner point Tfr, a left-rear corner point Trl and a right-rear corner point Trr in the defined XY plane. In addition, the positions of the own vehicle presence region EA1 and the target presence region EA2 at the collision timing Ta may be represented alternatively by coordinates in the XY plane defined at the current time T0 (see FIG. 2). However, setting the reference position Pa of the own vehicle VM at the collision timing Ta to the intersection point (0, 0) between the X axis and the Y axis, the amount of data handled for calculation of the collision range can be reduced, thereby reducing the load on the calculation process of the collision range calculation unit 240.

The collision range CA is defined by the positional relationship between the own vehicle presence region EA1 and the target presence region EA2 at the collision timing Ta, more specifically by the positional relationship between a collision determination area CJ set on the outer periphery of the own vehicle presence region EA1 of the own vehicle VM and the target presence region EA2 as shown in, for example, FIGS. 8 to 11.

The collision determination area CJ set on the outer periphery of the own vehicle presence region EA1 includes a collision determination area CJl on the left side, a collision determination area CJr on the right side, a collision determination area CJf on the front side and a collision determination area CJb on the rear side of the own vehicle presence region EA1. The collision determination area CJl on the left side of the own vehicle VM is set to a rectangular area specified by the coordinates of two points offset from the two corner points Vfl and Vrl on the left side of the own vehicle presence region EA1 inward in the X direction by a preset margin and the coordinates of two points offset from the two corner points Vfl and Vrl outward in the X direction by a preset width. Similarly to the left collision determination area CJl, the collision determination area CJr on the right side of the own vehicle VM is set to a rectangular area specified by the coordinates of four points offset from the two corner points Vfr and Vrr on the right side of the own vehicle presence region EA1 inward or outward in the X direction. The collision determination area CJf on the front side of the own vehicle VM is set to a rectangular area specified by the coordinates of two points offset from the two corner points Vfl and Vfr on the front side of the own vehicle presence region EA1 inward in the Y direction by a preset margin and the coordinates of two points offset from the two corner points Vfl and Vfr outward in the Y direction by a preset width. Similarly to the front collision determination area CJf, the collision determination area CJb on the rear side of the own vehicle VM is set to a rectangular area specified by the coordinates of four points offset from the two corner points Vrl and Vrr on the rear side of the own vehicle presence region EA1 inward or outward in the Y direction.

Figure 8:
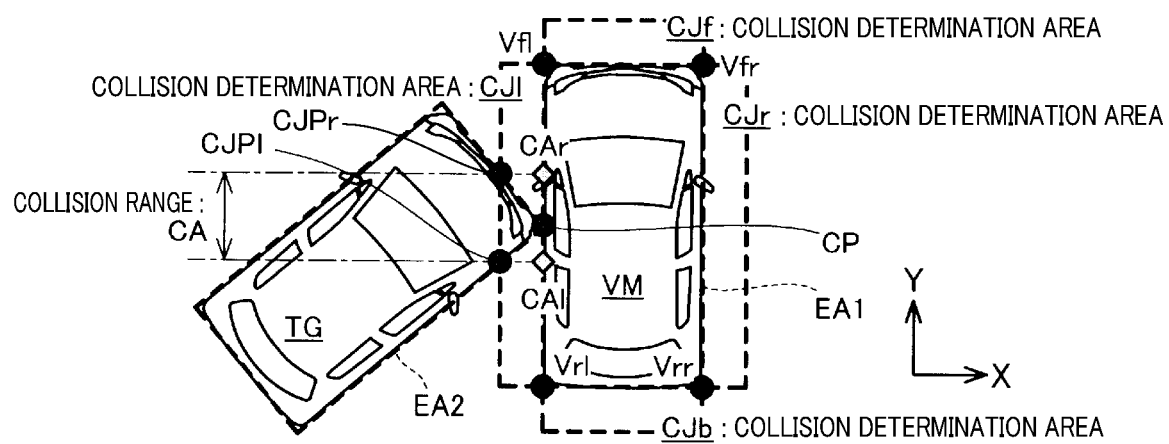
FIG. 8 is an explanatory diagram illustrating a first example of the collision range.

As shown in FIG. 8, in the case of the target TG colliding against a left side surface of the own vehicle VM, the collision range CA is set to the interval between two target end points CJPr and CJP1 in the Y direction; the two target end points CJPr and CJP1 are end points of that part of the target presence region EA2 which is located in the left collision determination area CJl. Of the two target end points CJPr and CJP1, the target end point CJPr is the end point on the right side and the target end point CJP1 is the end point on the left side as viewed from the own vehicle VM. The interval between the two target end points CJPr and CJP1 in the Y direction corresponds to a range represented by the interval between two positions CAr and CA1 at which the two target end points CJPr and CJP1 are projected onto a side of the own vehicle presence region EA1 parallel to an outer side of the left collision determination area CJl.

Similarly, although not shown in the drawings, in the case of the target TG colliding against a right side surface of the own vehicle VM, the collision range CA is set to the interval between two target end points CJPr and CJP1 in the Y direction; the two target end points CJPr and CJP1 are end points of that part of the target presence region EA2 which is located in the right collision determination area CJr.

Figure 9:
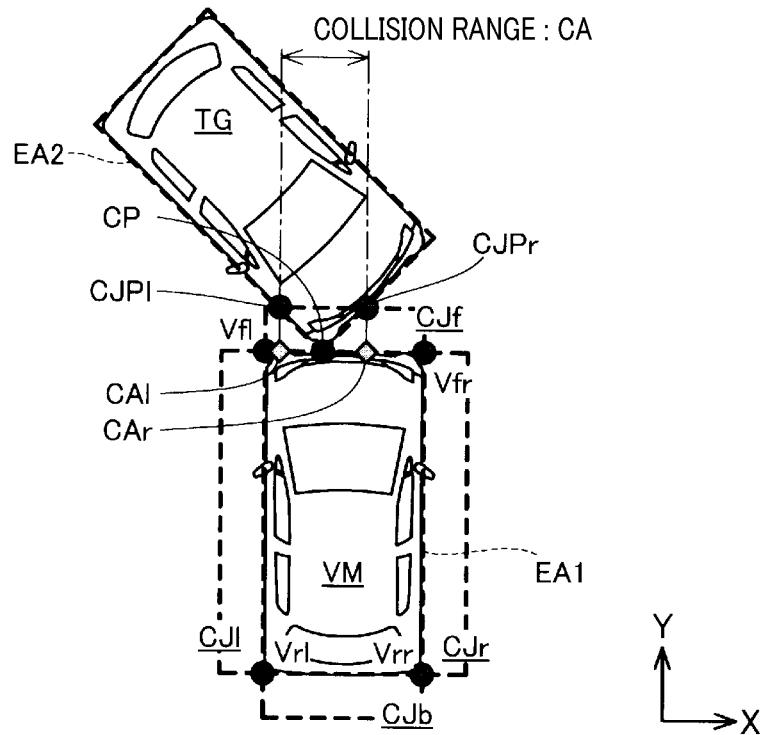
FIG. 9 is an explanatory diagram illustrating a second example of the collision range.

Moreover, as shown in FIG. 9, in the case of the target TG colliding against a front side surface of the own vehicle VM, the collision range CA is set to the interval between two target end points CJPr and CJP1 in the X direction; the two target end points CJPr and CJP1 are end points of that part of the target presence region EA2 which is located in the front collision determination area CH The interval between the two target end points CJPr and CJP1 in the X direction corresponds to a range represented by the interval between two positions CAr and CA1 at which the two target end points CJPr and CJP1 are projected onto a side of the own vehicle presence region EA1 parallel to an outer side of the front collision determination area CJf.

Similarly, although not shown in the drawings, in the case of the target TG colliding against a rear side surface of the own vehicle VM, the collision range CA is set to the interval between two target end points CJPr and CJP1 in the X direction; the two target end points CJPr and CJP1 are end points of that part of the target presence region EA2 which is located in the rear collision determination area CJb.

Figure 10:
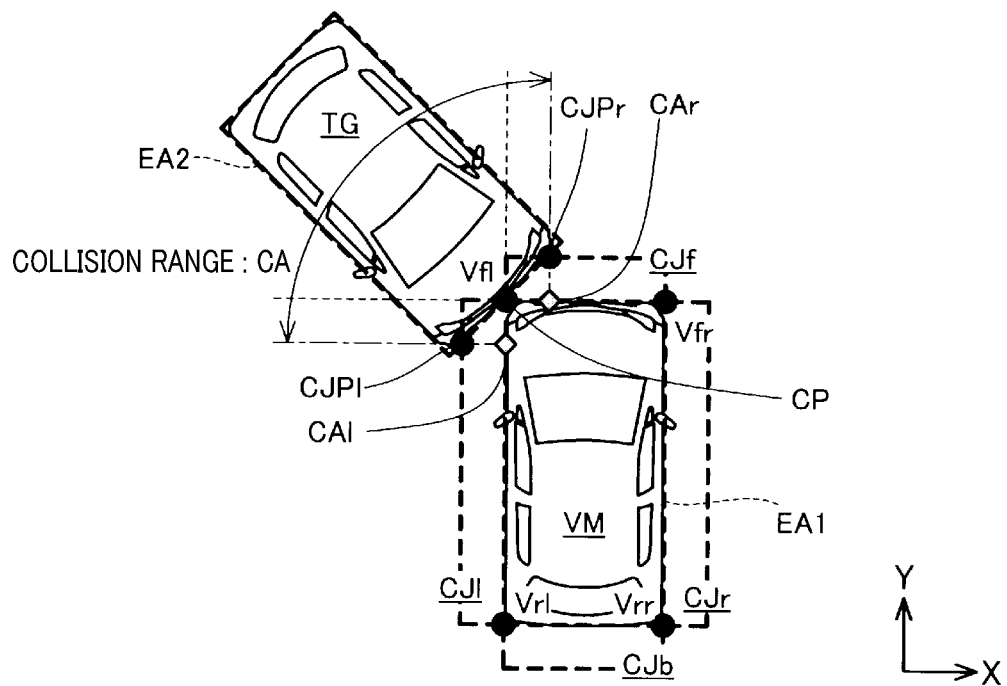
FIG. 10 is an explanatory diagram illustrating a third example of the collision range.

Furthermore, as shown in FIG. 10, in the case of the target TG colliding against the left-front corner point Vfl of the own vehicle VM, the target presence region EA2 may have two parts thereof respectively located in the left collision determination area CJl and the front collision determination area CJf. In this case, the collision range CA is set to a range from one target end point CJP1 to another target end point CJPr; the target end point CJP1 is located farthest from the collision point CP in that part of the target presence region EA2 which is located in the left collision determination area CJl, whereas the target end point CJPr is located farthest from the collision point CP in that part of the target presence region EA2 which is located in the front collision determination area CJf. Specifically, both the interval between the target end point CJP1 and an upper end of the left collision determination area CJl in the Y direction and the interval between a left end of the front collision determination area CJf and the target end point CJPr in the X direction together constitute the collision range CA. In addition, the interval between the target end point CJP1 and the upper end of the left collision determination area CJl in the Y direction corresponds to a range represented by the interval between two positions CA1 and Vfl at which the target end point CJP1 and an upper end point of an outer side of the left collision determination area CJl are projected onto a side of the own vehicle presence region EA1 parallel to the outer side of the left collision determination area CJl. Similarly, the interval between the left end of the front collision determination area CJf and the target end point CJPr in the X direction corresponds to a range represented by the interval between two positions Vfl and CAr at which a left end point of an outer side of the front collision determination area CJf and the target end point CJPr are projected onto a side of the own vehicle presence region EA1 parallel to the outer side of the front collision determination area CJf.

Similarly, although not shown in the drawings, in the case where the target TG collides against any one of the other corner points of the own vehicle VM and the target presence region EA2 has two parts thereof respectively located in two of the collision determination areas CJl, CJr, CJf and CJb, the collision range CA is set to a range from one target end point CJP1 to another target end point CJPr; the target end point CJP1 is located farthest from the collision point CP in that part of the target presence region EA2 which is located in one of the two collision determination areas, whereas the target end point CJPr is located farthest from the collision point CP in that part of the target presence region EA2 which is located in the other of the two collision determination areas.

Figure 11:
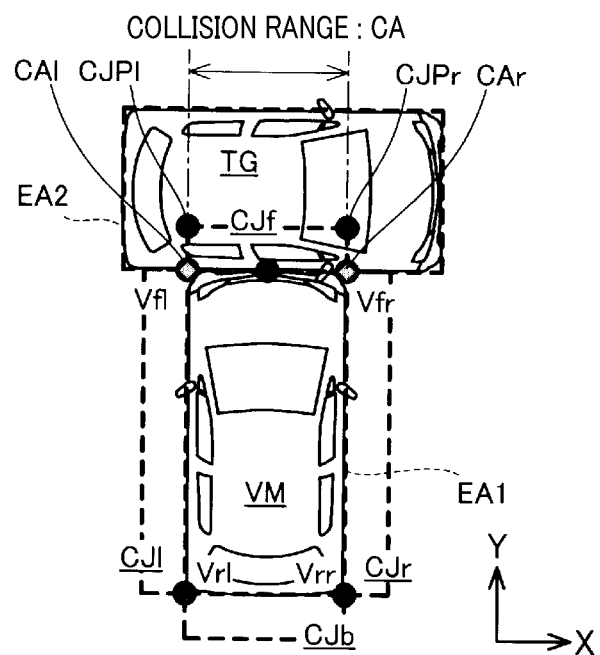
FIG. 11 is an explanatory diagram illustrating a fourth example of the collision range.

FIGS. 8 to 10 illustrate examples of the collision range CA in the cases where the target TG collides against the own vehicle VM. However, as shown in FIG. 11, in the cases where the own vehicle VM collides against the target TG, the collision range CA can be similarly set to the interval between two target end points CJPr and CJP1; the two target end points CJPr and CJP1 are end points of that part of the target presence region EA2 which is located in the collision determination area CJ of the own vehicle VM. Specifically, FIG. 11 illustrates an example of the collision range CA in the case of the own vehicle VM colliding against a right side surface of the target TG. In this case, the target presence region EA2 enters the front collision determination area CJf of the own vehicle VM over the entire range from the left end to the right end of the front collision determination area CJf; therefore, the two end points of an outer side of the front collision determination area CJf respectively constitute two target end points CJPr and CJP1 of that part of the target presence region EA2 which is located in the front collision determination area CJf. Moreover, the interval between the two target end points CJPr and CJP1 in the X direction corresponds to a range represented by the interval between two positions CAr and CA1 at which the two target end points CJPr and CJP1 are projected onto a side of the own vehicle presence region EA1 parallel to the outer side of the front collision determination area CJf. In addition, the range represented by the interval between the two positions CAr and CA1 corresponds to the entire range of the front collision determination area CJf in the X direction.

Similarly, although not shown in the drawings, in the case of the own vehicle VM colliding against any one of the other side surfaces of the target TG, the collision range CA is set to a range from one target end point CJP1 to another target end point CJPr; the two target end points CJPr and CJP1 are end points of that part of the target presence region EA2 which is located in the collision determination area CJ of the own vehicle VM.

As described above, the positions CA1 and CAr of the ends of the calculated collision range CA are represented by coordinates in the XY plane. In the left collision determination area CJl and the right collision determination area Or of the own vehicle VM, the coordinate value in the Y direction changes. In contrast, in the front collision determination area CJf and the rear collision determination area CJb of the own vehicle VM, the coordinate value in the X direction changes. If a determination as to whether to perform the braking operation for the own vehicle VM, which will be described later, was made by the braking determination unit 250 using the collision range CA represented by the coordinates in the XY plane, it would be necessary to take into account changes in both the X direction and the Y direction, thus making the determination process complicated. Therefore, in the present embodiment, the collision range calculation unit 240 converts the positions CA1 and CAr of the ends of the collision range CA represented by the coordinates in the two-dimensional coordinate system into coordinates in a one-dimensional coordinate system.

Figure 12:
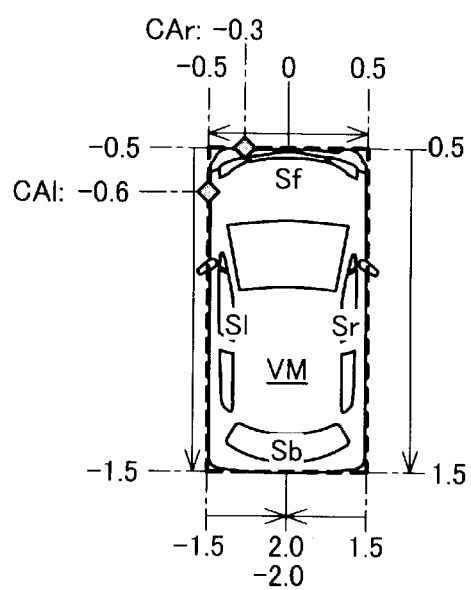
FIG. 12 is an explanatory diagram illustrating an example of a one-dimensional coordinate system used for a braking determination based on the collision range.

As the one-dimensional coordinate system, a coordinate system is employed in which the sides of the outer periphery of the own vehicle presence region EA1 are developed; onto the sides of the outer periphery of the own vehicle presence region EA1, the two target end points CJP1 and CJPr corresponding to the positions CA1 and CAr of the ends of the collision range CA are projected (see FIGS. 8 to 11). Specifically, as shown in FIG. 12, in the coordinate system employed in the present embodiment, the length of each of a front end side Sf, a left end side S1, a rear end side Sb and a right end side Sr of the own vehicle presence region EA1 is set to "1 (100%)"; the origin "0" is set to a central position of the front end side Sf; and the coordinate value of a central position of the rear end side Sb is "−2 (−200%)" in the counterclockwise direction and "2 (200%)" in the clockwise direction. It should be noted that the coordinate system is not limited to the above setting, but various settings are possible for the coordinate system.

For example, suppose that in the collision state shown in FIG. 10, the Y-coordinate difference between the left-front corner point Vfl and the left end position CA1 of the collision range CA is 10% of the Y-coordinate difference between the left-front corner point Vfl and the left-rear corner point Vrl. In this case, as shown in FIG. 12, the two-dimensional coordinates of the left end position CA1 are converted into −0.6. Moreover, suppose that in the collision state shown in FIG. 10, the X-coordinate difference between the left-front corner point Vfl and the right end position CAr of the collision range CA is 20% of the X-coordinate difference between the left-front corner point Vfl and the right-front corner point Vfr. In this case, as shown in FIG. 12, the two-dimensional coordinates of the right end position CAr are converted into −0.3.

Figure 13:
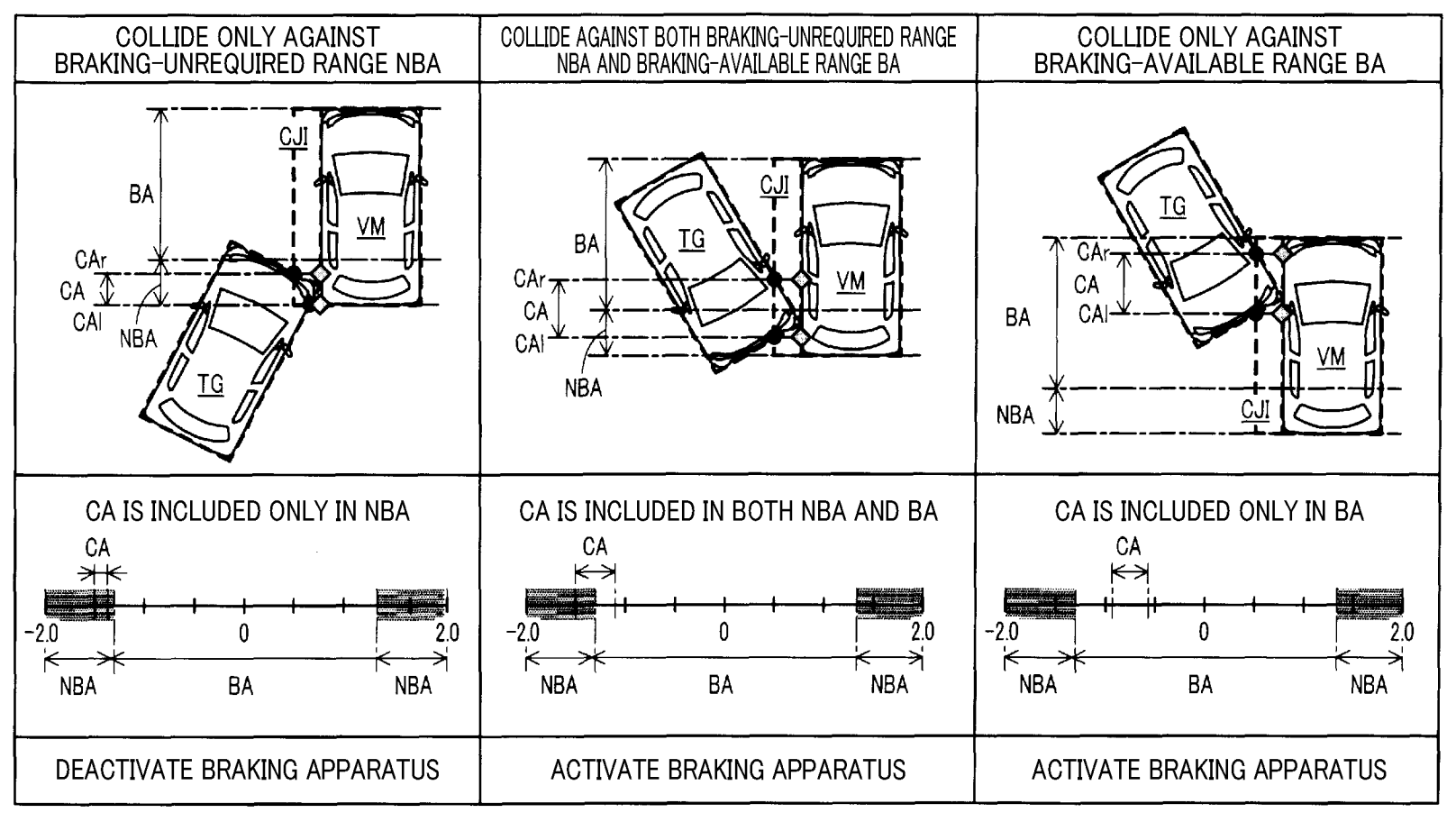

As shown in FIG. 13, the braking determination unit 250 determines, based on the positional relationship between the collision range CA calculated by the collision range calculation unit 240 and the braking-unrequired range NBA in the own vehicle VM, whether to perform the braking operation for the own vehicle VM by the braking apparatus 310; then, the braking determination unit 250 controls the braking operation for the own vehicle VM according to the determination result. The braking-unrequired range NBA in the own vehicle VM is a range predetermined for the own vehicle presence region EA1; and the other range than the braking-unrequired range NBA is predetermined as a braking-available range BA. The braking-unrequired range NBA is set to a range in which: decelerating the own vehicle VM actually increases the probability of collision against an area where an occupant is present in the own vehicle VM; and therefore it is preferable to refrain from automatically performing the braking operation for the own vehicle VM and allow the driver of the own vehicle VM to accelerate the own vehicle VM. For example, the braking-unrequired range NBA may be set to a range corresponding to the position of a rear trunk of the own vehicle VM. On the other hand, the braking-available range BA is set to a range in which it is preferable to decelerate the own vehicle VM so as to reduce the probability of collision.

As shown in the left column of FIG. 13, when the collision range CA is included only in the braking-unrequired range NBA, the braking determination unit 250 determines that the target TG will collide only against the braking-unrequired range NBA of the own vehicle VM. Therefore, the braking apparatus 310 is deactivated by the braking determination unit 250 and thus the braking operation for the own vehicle VM is not performed.

Moreover, as shown in the right column of FIG. 13, when the collision range CA is included only in the braking-available range BA, the braking determination unit 250 determines that the target TG will collide only against the braking-available range BA of the own vehicle VM. Therefore, the braking apparatus 310 is activated by the braking determination unit 250 to perform the braking operation for the own vehicle VM.

Furthermore, as shown in the middle column of FIG. 13, when the collision range CA is included in both the braking-unrequired range NBA and the braking-available range BA, the braking determination unit 250 determines that the target TG will collide against the braking-available range BA as well as against the braking-unrequired range NBA. Therefore, the braking determination unit 250 prioritizes the braking operation so that the braking apparatus 310 is activated by the braking determination unit 250 to perform the braking operation for the own vehicle VM.

Figure 14:
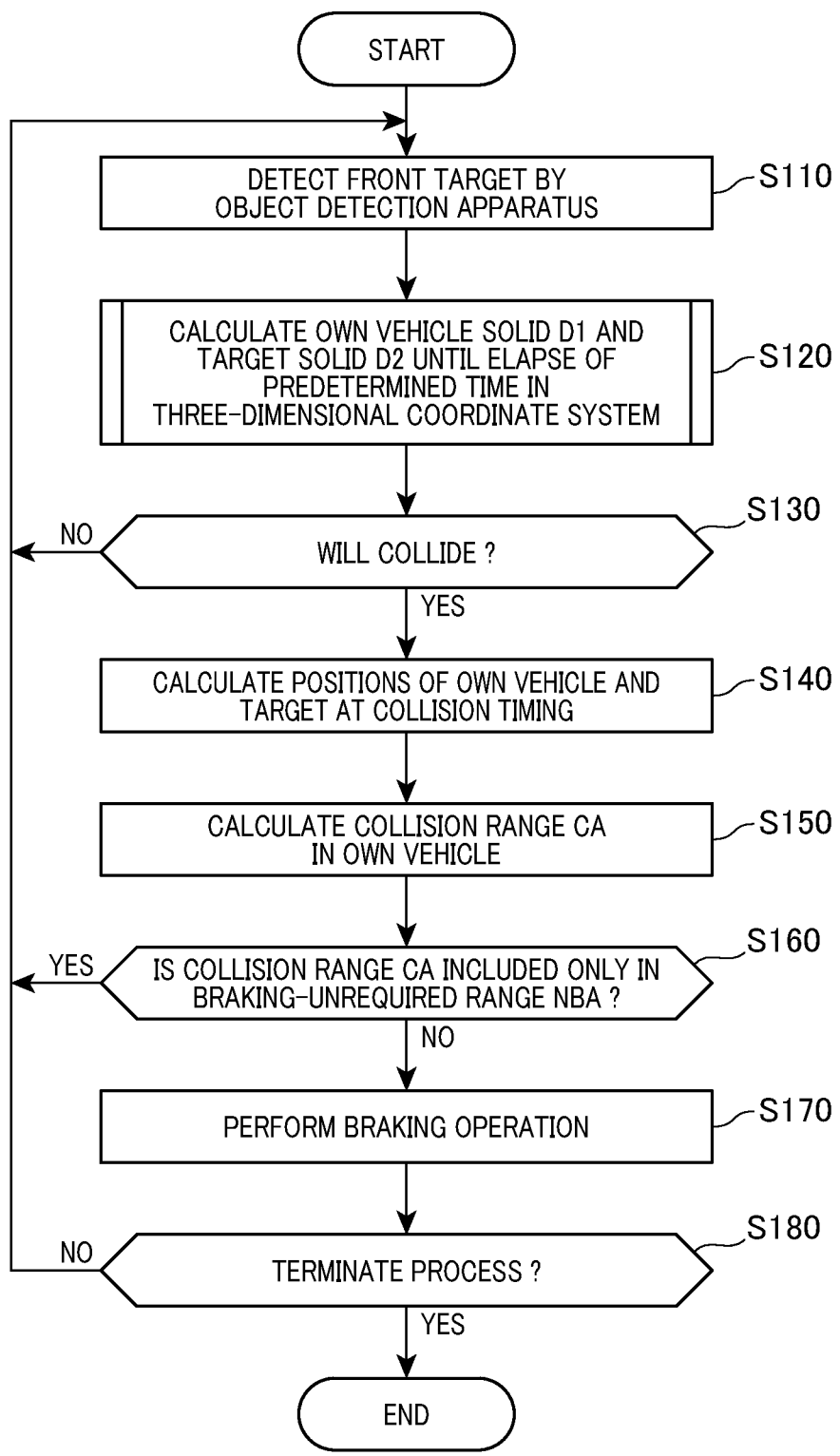
FIG. 14 is a flowchart illustrating a procedure of the braking determination based on the collision range according to a first embodiment.

The above-described collision determination and braking control process are performed by the braking control ECU 200 according to the procedure shown in FIG. 14. In addition, this process is continuously performed from when the braking control ECU 200 is commanded to perform the process until the braking control ECU 200 is commanded to terminate the process.

First, in step S110, the object detection apparatus 110 detects the target TG in front of the own vehicle VM. Then, in step S120, the own vehicle change calculation unit 210 calculates the own vehicle solid D1 in the three-dimensional coordinate system defined based on the current position of the own vehicle VM; the own vehicle solid D1 indicates the change of the own vehicle presence regions EA1 on the own vehicle estimated route PA1 from the current time to the elapse of a predetermined time (see FIGS. 2 and 4). Moreover, in step S120, the target change calculation unit 220 calculates the target solid D2 in the three-dimensional coordinate system; the target solid D2 indicates the change of the target presence regions EA2 on the target estimated route PA2 calculated based on the position of the target TG and the relative speed of the target TG to the own vehicle VM both of which are outputted from the target detection apparatus 110 (see FIGS. 3 and 4). In addition, as a specific procedure for calculating the own vehicle solid D1 and the target solid D2, it is possible to employ, for example, the procedure described in Japanese Patent Application Publication No. JP 2020-008288 A.

In step S130, the collision determination unit 230 determines whether the target TG will collide with the own vehicle VM by determining whether the own vehicle solid D1 and the target solid D2 calculated in step S120 intersect each other. Specifically, as described above with reference to FIG. 5, when there is an overlapping region CPA between the first determination region DA1 and the second determination region DA2 at the same elapsed time T, the collision determination unit 230 determines that the own vehicle solid D1 and the target solid D2 intersect each other and thus determines that the target TG will collide with the own vehicle VM. If it is determined in step S130 that the target TG will collide with the own vehicle VM, the process proceeds to step S140. On the other hand, if it is determined in step S130 that the target TG will not collide with the own vehicle VM, the process returns to step S110.

In step S140, the collision range calculation unit 240 calculates the positions of the own vehicle VM and the target TG at the collision timing Ta, more specifically, the positions of the own vehicle presence region EA1 and the target presence region EA2 at the collision timing Ta (see FIG. 7). In step S150, the collision range calculation unit 240 calculates the collision range CA in the own vehicle VM (see FIGS. 8 to 12).

In step S160, the braking determination unit 250 determines whether the collision range CA is included only in the braking-unrequired range NBA. As shown in FIG. 13, if the collision range CA is included only in the braking-unrequired range NBA, the process returns to step S110 without performing the braking operation for the own vehicle VM by the braking apparatus 310. On the other hand, if the collision range CA is not included only in the braking-unrequired range NBA, i.e., if the collision range CA is included only in the braking-available range BA or included in both the braking-available range BA and the braking-unrequired range NBA, the process proceeds to step S170. In step S170, the braking operation for the own vehicle VM is performed by the braking apparatus 310. Then, the process returns to step S110 to repeat the process shown in FIG. 14 until there is a command to terminate the process. In contrast, if there is a command to terminate the process shown in FIG. 14, the braking control ECU 200 terminates the process.

As described above, in the present embodiment, when the collision range CA is included only in the braking-unrequired range NBA and thus the target TG is predicted to collide only against the braking-unrequired range NBA of the own vehicle VM, the braking apparatus 310 is deactivated and thus the braking operation for the own vehicle VM is not performed. As described previously, the braking-unrequired range NBA is a range in which: decelerating the own vehicle VM actually increases the probability of collision against an area where an occupant is present in the own vehicle VM; and therefore it is preferable to refrain from automatically performing the braking operation for the own vehicle VM and allow the driver of the own vehicle VM to accelerate the own vehicle VM. Therefore, when the target TG will probably collide only against the braking-unrequired range NBA of the own vehicle VM, it is possible to deactivate the braking apparatus 310 and thereby prevent the braking operation for the own vehicle VM from being performed. Consequently, it is possible to prevent the own vehicle VM from being decelerated, thereby reducing the probability of collision between the own vehicle VM and the target TG.

Moreover, in the present embodiment, the collision position in the own vehicle VM, at which the target TG will probably collide with the own vehicle VM, is represented by the collision range CA. Consequently, it becomes possible to represent the collision position taking into account variation in the collision position which would occur in the case of representing the collision position by the collision point CP. As a result, it becomes possible to improve the prediction accuracy of the collision position.

Furthermore, in the present embodiment, the positions of the collision range CA, the braking-available range BA and the braking-unrequired range NBA are represented using the one-dimensional coordinate system in which the sides of the outer periphery of the own vehicle presence region EA1 are developed.
Consequently, it becomes possible to easily determine the positional relationship between the collision range CA, the braking-unrequired range NBA and the braking-available range BA.

Moreover, in the present embodiment, the determination as to whether the target TG will collide with the own vehicle VM is made depending on the determination as to whether the own vehicle solid D1 indicating the change of the own vehicle presence regions EA1 and the target solid D2 indicating the change of the target presence regions EA2 intersect each other in the three-dimensional coordinate system that includes the elapsed time from the current time. In this case, the collision determination is made using the own vehicle solid D1 and the target solid D2 both of which extend in the three-dimensional coordinate system; therefore, the region where the intersection occurs becomes larger than in the case of using movement loci intersecting each other. Consequently, it becomes possible to make a collision determination corresponding to various situations including the positional relationship of the target TG to the own vehicle VM and the movement state of the target TG. As a result, it becomes possible to suitably determine whether the target TG will collide with the own vehicle VM. Furthermore, since the collision determination is made depending on the determination as to whether the own vehicle solid D1 and the target solid D2 intersect each other in the three-dimensional coordinate system, it becomes possible to suitably make the collision determination taking into account the passage of time.

Second Embodiment

Figure 15:
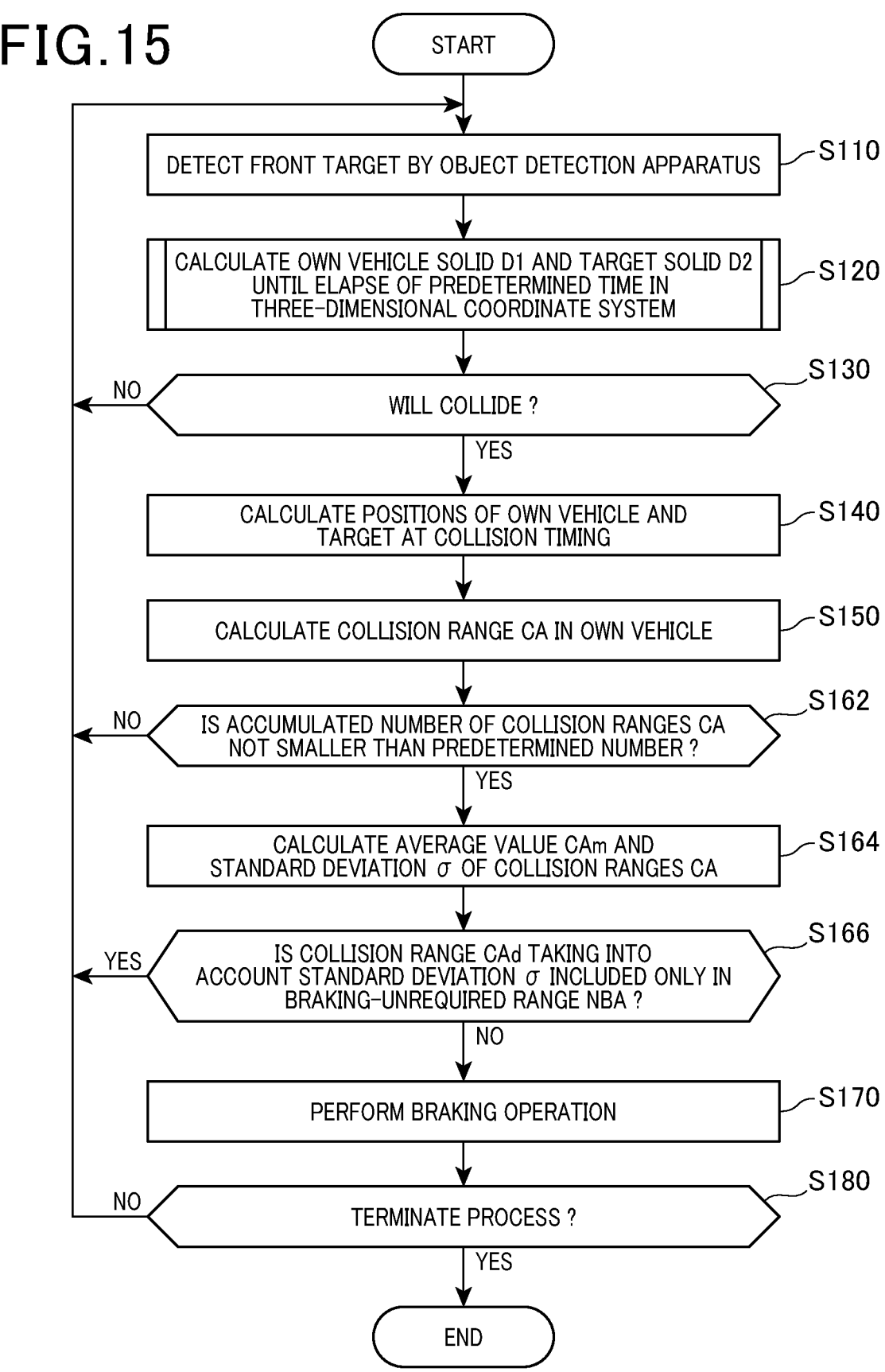
FIG. 15 is a flowchart illustrating a procedure of the braking determination based on the collision range according to a second embodiment.

A braking control ECU 200 according to the second embodiment has the same configuration as the braking control ECU 200 according to the first embodiment, except that the braking control ECU 200 according to the second embodiment performs a collision determination and braking control process shown in FIG. 15 instead of the collision determination and braking control process described in the first embodiment with reference to FIG. 14. Therefore, identical parts in the second embodiment and the first embodiment are assigned the same reference numerals and repeated explanation thereof will be omitted hereinafter. The process shown in FIG. 15 differs from the process shown in FIG. 14 only in that in the process shown in FIG. 15, step S160 of the process shown in FIG. 14 is replaced with steps S162, S164 and S166.

In step S150 of the process shown in FIG. 15, after the collision range CA in the own vehicle VM is calculated by the collision range calculation unit 240, the calculated collision range CA is stored in a predetermined storage area. Then, in step S162, the collision range calculation unit 240 determines whether the accumulated number of the collision ranges CA stored in the storage area is not smaller than a predetermined number. If the accumulated number of the collision ranges CA is smaller than the predetermined number, the process returns to step S110 to repeat steps S110 to S150. In contrast, if the accumulated number of the collision ranges CA is not smaller than the predetermined number, the process proceeds to step S164.

In step S164, the collision range calculation unit 240 calculates an average value CAm and a standard deviation σ of the predetermined number of the accumulated collision ranges CA. Specifically, the collision range calculation unit 240 calculates an average value CAlm and a standard deviation σl of the left end positions CAl of the accumulated collision ranges CA and an average value CArm and a standard deviation σr of the right end positions CAr of the accumulated collision ranges CA.

Figure 16:
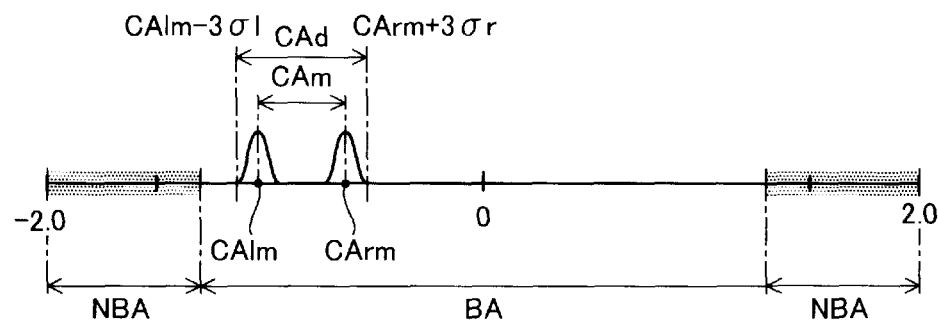
FIG. 16 is a first explanatory diagram illustrating the braking determination based on the collision range according to the second embodiment.

In step S166, the braking determination unit 250 determines whether a collision range CAd, which is obtained by taking into account the standard deviation σ into the average value CAm, is included only in the braking-unrequired range NBA. The collision range CAd is a range which has a distribution calculated based on the average value CAm and the standard deviation σ. For example, the collision range CAd may be a range obtained by adding a distribution of ±3σ to the average value CAm of the collision ranges CA. Specifically, as shown in FIG. 16, the collision range CAd may be defined as the interval between a left end position (CAlm-3σl) and a right end position (CArm+3σr); the left end position (CAlm-3σl) is located outward from the average value CAlm of the left end positions CAl by a distribution of 3σl, while the right end position (CArm+3σr) is located outward from the average value CArm of the right end positions CAr by a distribution of 3σr.

Figure 17:
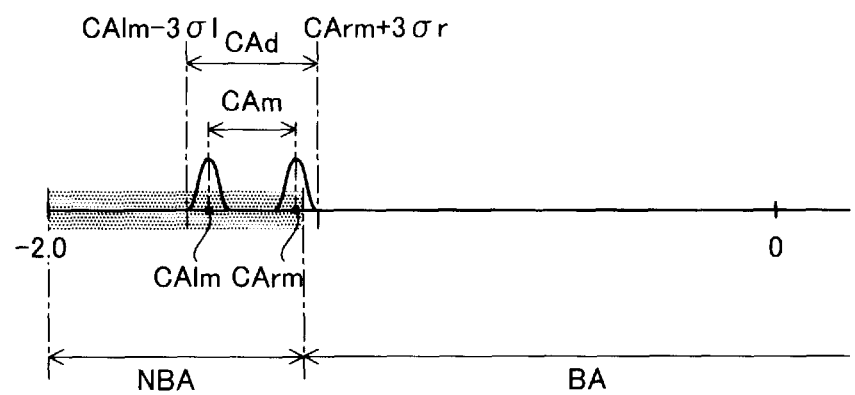
FIG. 17 is a second explanatory diagram illustrating the braking determination based on the collision range according to the second embodiment.

If the collision range CAd is included only in the braking-unrequired range NBA as shown in FIG. 17, the process returns to step S110 without performing the braking operation for the own vehicle VM by the braking apparatus 310. On the other hand, if the collision range CAd is not included only in the braking-unrequired range NBA, i.e., if the collision range CAd is included only in the braking-available range BA (see FIG. 16) or included in both the braking-available range BA and the braking-unrequired range NBA, the process proceeds to step S170. In step S170, the braking operation for the own vehicle VM is performed by the braking apparatus 310.

As described above, in the present embodiment, when the collision range CAd with the distribution is included only in the braking-unrequired range NBA and thus the target TG is predicted to collide only against the braking-unrequired range NBA of the own vehicle VM, the braking apparatus 310 is deactivated and thus the braking operation for the own vehicle VM is not performed. Consequently, it becomes possible to improve the prediction accuracy of the collision range, thereby improving the accuracy of controlling whether to perform the braking operation for the own vehicle VM.

Third Embodiment

Figure 18:
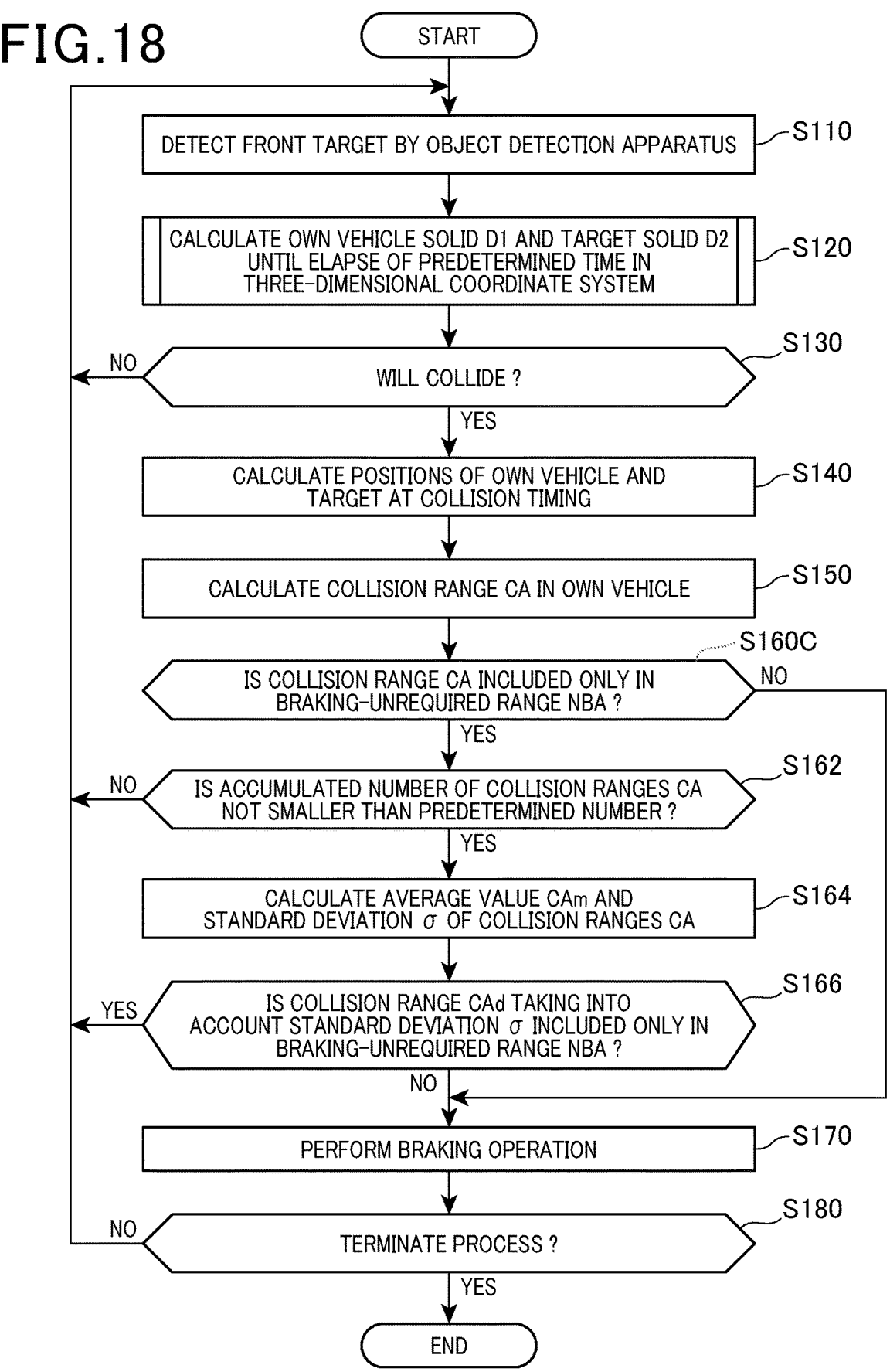
FIG. 18 is a flowchart illustrating a procedure of the braking determination based on the collision range according to a third embodiment.

A braking control ECU 200 according to the third embodiment has the same configuration as the braking control ECU 200 according to the first embodiment, except that the braking control ECU 200 according to the third embodiment performs a collision determination and braking control process shown in FIG. 18 instead of the collision determination and braking control process described in the first embodiment with reference to FIG. 14. Therefore, identical parts in the third embodiment and the first embodiment are assigned the same reference numerals and repeated explanation thereof will be omitted hereinafter. The process shown in FIG. 18 differs from the process shown in FIG. 14 only in that in the process shown in FIG. 18: step S160 of the process shown in FIG. 14 is replaced with step S160C; and steps S162, S164 and S166 of the process described in the second embodiment with reference to FIG. 15 are added between step S160C and step S170.

In step S160 of the collision determination and braking control process according to the first embodiment, the braking determination unit 250 determines whether the collision range CA is included only in the braking-unrequired range NBA. Further, if it is determined in step S160 that the collision range CA is included only in the braking-unrequired range NBA, the process returns to step S110 (see FIG. 14). In contrast, as shown in FIG. 18, in step S160C of the collision determination and braking control process according to the present embodiment, the braking determination unit 250 also determines whether the collision range CA is included only in the braking-unrequired range NBA. However, if it is determined in step S160C that the collision range CA is included only in the braking-unrequired range NBA, the process proceeds to step S162 instead of returning to step S110. On the other hand, if it is determined in step S160C that the collision range CA is not included only in the braking-unrequired range NBA, the process proceeds to step S170 in which the braking operation for the own vehicle VM is performed by the braking apparatus 310.

Moreover, as described in the second embodiment, if it is determined in step S162 that the accumulated number of the collision ranges CA is not smaller than the predetermined number, the process proceeds to step S164. In step S164, the average value CAm and the standard deviation σ of the positions of the collision ranges CA are calculated (see FIG. 15). Then, in step S166, it is determined whether the collision range CAd, which is obtained by taking into account the standard deviation σ into the average value CAm, is included only in the braking-unrequired range NBA. If the collision range CAd is included only in the braking-unrequired range NBA (see FIG. 17), the process returns to step S110 without performing the braking operation for the own vehicle VM by the braking apparatus 310. On the other hand, if the collision range CAd is not included only in the braking-unrequired range NBA (see FIG. 16), the process proceeds to step S170 in which the braking operation for the own vehicle VM is performed by the braking apparatus 310.

As described above, in the present embodiment, the braking operation for the own vehicle VM is not performed only when both the collision range CA calculated upon collision being predicted and the collision range CAd with the distribution calculated afterward are included only in the braking-unrequired range NBA. Consequently, it becomes possible to deactivate the braking operation only when it is more likely that the collision position is located only within the braking-unrequired range NBA.

Fourth Embodiment

Figure 19:
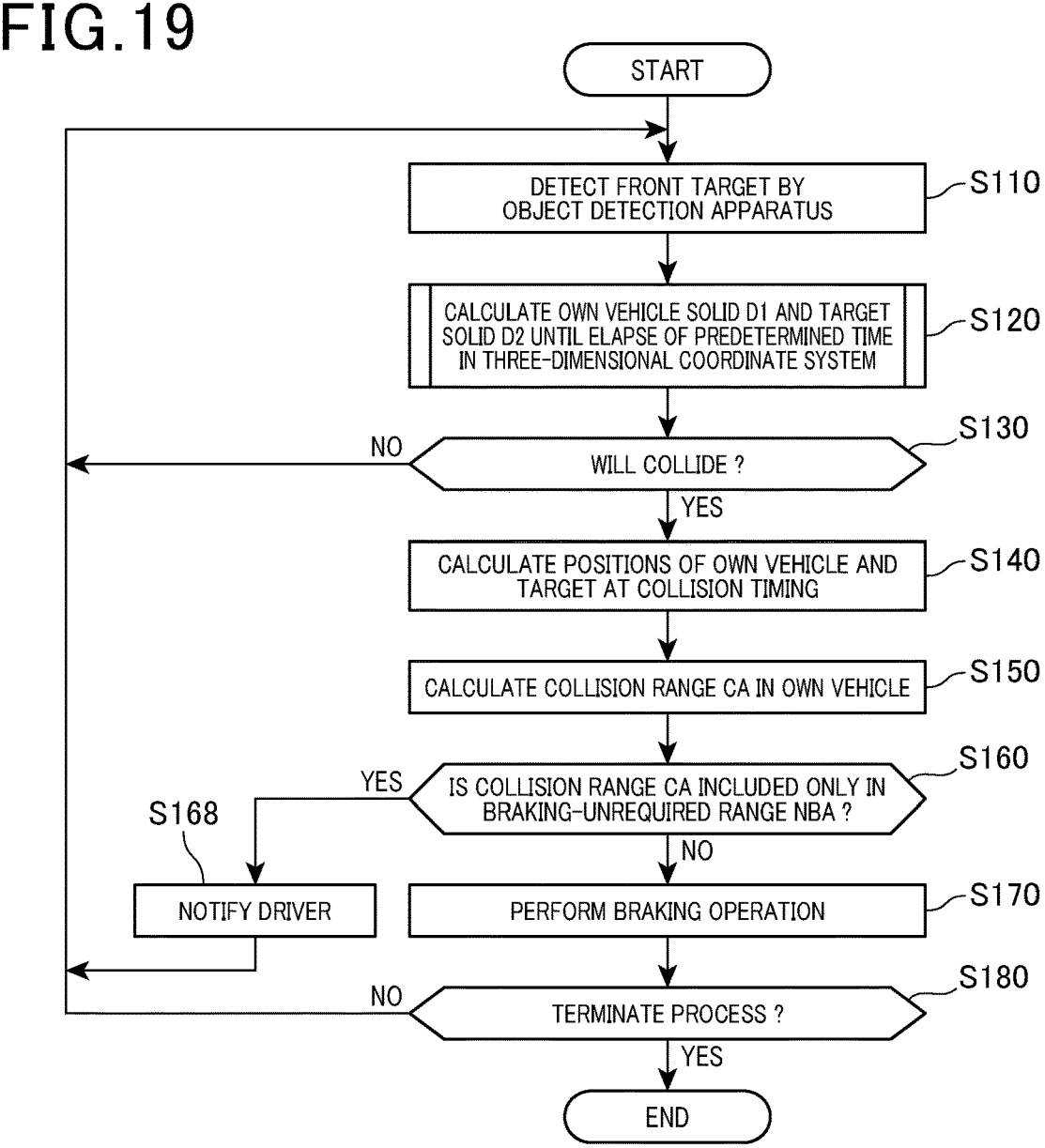
FIG. 19 is a flowchart illustrating a procedure of the braking determination based on the collision range according to a fourth embodiment.

A braking control ECU 200 according to the fourth embodiment has the same configuration as the braking control ECU 200 according to the first embodiment, except that the braking control ECU 200 according to the fourth embodiment performs a collision determination and braking control process shown in FIG. 19 instead of the collision determination and braking control process described in the first embodiment with reference to FIG. 14. Therefore, identical parts in the fourth embodiment and the first embodiment are assigned the same reference numerals and repeated explanation thereof will be omitted hereinafter. The process shown in FIG. 19 differs from the process shown in FIG. 14 only in that in the process shown in FIG. 19, step S168 is added to the return path from step S160 to step S110.

In step S160 of the process shown in FIG. 19, the braking determination unit 250 determines whether the collision range CA is included only in the braking-unrequired range NBA. If the collision range CA is included only in the braking-unrequired range NBA and thus the braking operation for the own vehicle VM is not performed by the braking apparatus 310, the process proceeds to step S168 provided in the return path to step S110. In step S168, the braking control ECU 200 performs a notification to the driver of the own vehicle VM. The content of the notification may be, for example, a displayed message or voice message prompting the driver to perform an acceleration manipulation for collision avoidance, or an indicator light or sound indicating an acceleration instruction.

As described above, in the present embodiment, when the braking operation for the own vehicle VM is not performed by the braking apparatus 310, the driver can be prompted to perform an acceleration manipulation, thereby increasing the probability of collision avoidance.

Moreover, in the present embodiment, a configuration is illustrated where a notification is performed in step S168. However, instead of or in addition to a notification, an acceleration operation may be automatically performed for the own vehicle VM by an acceleration apparatus, so as to actively avoid collision.

In addition, the above-described configuration according to the present embodiment can also be applied to the second and third embodiments.

Fifth Embodiment

Figure 20:
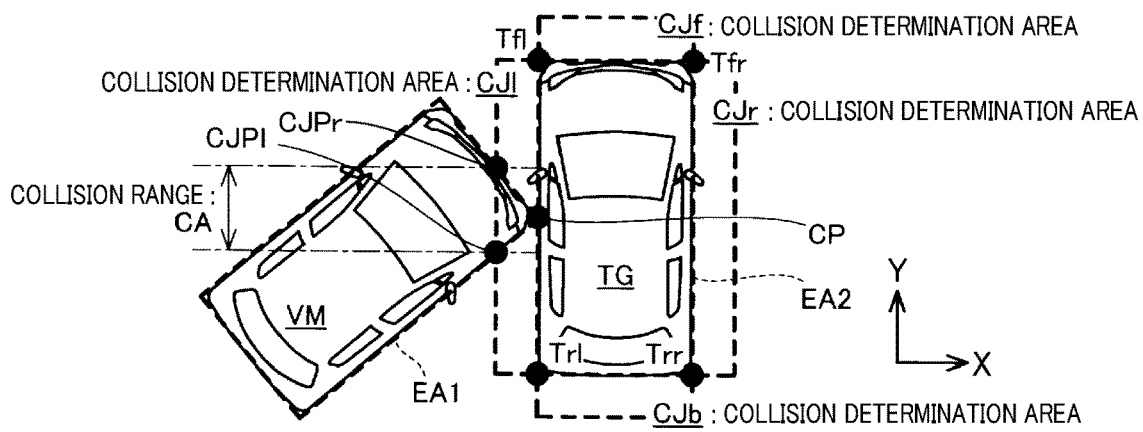
FIG. 20 is an explanatory diagram illustrating the collision range according to a fifth embodiment.

In the first embodiment, an example is illustrated where the collision range CA in the own vehicle VM is defined by the positional relationship between the collision determination area CJ set on the outer periphery of the own vehicle presence region EA1 of the own vehicle VM and the target presence region EA2 at the collision timing Ta (see FIGS. 8 to 11). However, the positional relationship in collision between the own vehicle VM and the target TG is a relative one. As shown in FIG. 20, a collision range CA in the target TG may alternatively used which is defined by the positional relationship between a collision determination area CJ set on the outer periphery of the target presence region EA2 of the target TG and the own vehicle presence region EA1 at the collision timing Ta. Moreover, the braking-unrequired range NBA and the braking-available range BA used in this case are a braking-unrequired range and a braking-available range in the target TG.

The braking-unrequired range NBA in the target TG may be set to, for example, a range corresponding to the position of a rear trunk of the target TG that is another vehicle. When the own vehicle VM is predicted to collide against this range, it is highly probable that the driver of the own vehicle VM does not perform a deceleration manipulation for the own vehicle VM, assuming that the driver of the target TG will perform an acceleration manipulation for the target TG. Therefore, when the collision range CA in the target TG is included only in the braking-unrequired range NBA in the target TG, the braking operation for the own vehicle VM may not be performed.

In addition, the collision determination and braking control process according to the first embodiment (see FIG. 14) can be similarly applied to the present embodiment by replacing the collision range CA and the braking-unrequired range NBA in the own vehicle VM with the collision range CA and the braking-unrequired range NBA in the target TG.

Moreover, the above explanation has been given taking the first embodiment as an example, but the same applies to the second to the fourth embodiments.

Other Embodiments (1) In the above-described embodiments, the object detection apparatus 110 is configured with the millimeter-wave radar sensor 111 and the radar ECU 112. However, the object detection apparatus 110 is not limited to this configuration. For example, the object detection apparatus 110 may alternatively be configured as an apparatus which includes an image sensor that detects the position of the target TG using a captured image or a laser sensor that detects the position of the target TG using laser light. Moreover, in the case of the own vehicle VM being capable of performing inter-vehicle communication with other vehicles traveling around it, the own vehicle VM may acquire, through the inter-vehicle communication, the position of the target TG detected by an object detection apparatus provided in another vehicle. Furthermore, the object detection apparatus 110 may be configured as a combination of these various apparatuses.

(2) In the above-described embodiments, explanation has been given taking another vehicle as an example of the target TG. However, the target TG is not limited to another vehicle, but may alternatively be any other object which may collide against the own vehicle VM, such as a bicycle, a motorcycle, a pedestrian, an animal, a structure or the like.

(3) In the above-described embodiments, the target presence region EA2 of the target TG is set as a rectangular region that includes the entire outer periphery of the target TG in a view of the target TG from the vertically upper side. However, the target presence region EA2 is not limited to such a rectangular region, but may alternatively be set as any other polygon that includes the entire outer periphery of the target TG in a view of the target TG from the vertically upper side.

(4) In the above-described first to fourth embodiments, the braking-unrequired range NBA in the own vehicle VM is set to a range corresponding to the position of a rear trunk of the own vehicle VM. However, the braking-unrequired range NBA in the own vehicle VM is not limited to such a range, but may alternatively be set to various other ranges in which: decelerating the own vehicle VM actually increases the probability of collision against an area where an occupant is present in the own vehicle VM; and therefore it is preferable to refrain from automatically performing the braking operation for the own vehicle VM and allow the driver of the own vehicle VM to accelerate the own vehicle VM. Moreover, in the above-described fifth embodiment, the braking-unrequired range NBA in the target TG is set to a range corresponding to the position of a rear trunk of the target TG that is another vehicle. However, the braking-unrequired range NBA in the target TG is not limited to such a range, but may alternatively be set to various other ranges in which collision is highly likely to be avoided through acceleration of the target TG without deceleration of the own vehicle VM.

(5) In the above-described embodiments, the positional relationship between the collision range CA and the braking-unrequired range NBA is determined using the one-dimensional coordinate system converted from the two-dimensional coordinate system. However, the positional relationship between the collision range CA and the braking-unrequired range NBA may alternatively be determined using the two-dimensional coordinate system. In this case, although the determination process might become complicated, it would still be possible to determine the positional relationship between the collision range CA and the braking-unrequired range NBA.

(6) In the above-described embodiments, the probability of collision is determined by determining whether the own vehicle solid D1 and the target solid D2, both of which extend in the three-dimensional coordinate system, intersect each other. However, the probability of collision may alternatively be determined by determining whether the linear own vehicle estimated route PA1 of the own vehicle VM and the linear target estimated route PA2 of the target TG intersect each other in the two-dimensional coordinate system. In this case, although the collision determination accuracy might be lower than that in the above-described embodiments, it would still be possible to determine the probability of collision.

(7) In the above-described embodiments, the collision position is represented by the collision range CA; and the control on whether to perform the braking operation for the own vehicle VM is carried out according to the positional relationship between the collision range CA and the braking-unrequired range NBA. However, the collision position may alternatively be represented by the collision point CP; and the control on whether to perform the braking operation for the own vehicle VM may alternatively be carried out according to the positional relationship between the collision point CP and the braking-unrequired range NBA. In this case, although the accuracy of determining the positional relationship between the collision point CP and the braking-unrequired range NBA might be lower than the accuracy of determining the positional relationship between the collision range CA and the braking-unrequired range NBA in the above-described embodiments, it would still be possible to control, according to the positional relationship between the collision point CP and the braking-unrequired range NBA, whether to perform the braking operation for the own vehicle VM.

(8) In the above-described embodiments, the braking control apparatus is implemented by the braking control ECU 200 that is configured with a computer including a CPU, a ROM, a RAM, input/output interfaces and the like; and each function is realized in software by the CPU executing an application corresponding to each function. However, the braking control apparatus is not limited to the above configuration; and each function may alternatively be realized in hardware by a discrete circuit or an integrated circuit. That is, the control apparatus and method in each of the above-described embodiments may be realized by a dedicated computer that includes a processor, which is programmed to perform one or more functions embodied by a computer program, and a memory. As an alternative, the control apparatus and method in each of the above-described embodiments may be realized by a dedicated computer that includes a processor configured with one or more dedicated hardware logic circuits. As another alternative, the control apparatus and method in each of the above-described embodiments may be realized by one or more dedicated computers configured with a combination of a processor programmed to perform one or more functions, a memory and a processor configured with one or more dedicated hardware logic circuits. In addition, the computer program may be stored as computer-executable instructions in a computer-readable non-transitory tangible recording medium.

As above, the present disclosure has been described based on the embodiments and modifications. The above-described embodiments are intended to facilitate understanding of the present disclosure, and do not limit the present disclosure. The present disclosure may be modified and improved without departing from the spirit of the present disclosure and the scope of the claims. The present disclosure also includes equivalents thereof. For example, the technical features in the embodiments and modifications corresponding to the technical features described in the summary of the present disclosure may be suitably replaced or combined with other technical features in order to solve some or all of the above-described problems, or in order to achieve some or all of the above-described advantageous effects. In addition, the technical features may be suitably removed unless they are described as essential in the present specification.

What is claimed is:

1. A braking control apparatus for controlling a braking operation for an own vehicle, the braking control apparatus being configured to:
    acquire information on an object detected around the own vehicle;
    calculate, when a collision between the own vehicle and the object is predicted based on both an estimated route of the object estimated based on the acquired information on the object and an estimated route of the own vehicle, a collision range in the own vehicle, which includes a collision point in the own vehicle, at a collision timing between the own vehicle and the object; and
    control, according to a positional relationship between a predetermined braking-unrequired range in the own vehicle and the calculated collision range in the own vehicle, whether to perform the braking operation for the own vehicle.

2. The braking control apparatus as set forth in claim 1, wherein
    the collision point in the own vehicle is calculated based on a positional relationship between an own vehicle presence region and an object presence region at the collision timing when an own vehicle solid and an object solid intersect each other in a three-dimensional coordinate system, the own vehicle solid being a solid that indicates change of own vehicle presence regions on the estimated route of the own vehicle, the object solid being a solid that indicates change of object presence regions on the estimated route of the object, the three-dimensional coordinate system being defined by both a distance in an own vehicle traveling direction and a distance in a vehicle width direction in the own vehicle at a current time, and elapsed time from the current time.

3. The braking control apparatus as set forth in claim 2, wherein
    the collision range in the own vehicle is a range where a part of the object presence region at the collision timing, which is located in a collision determination area surrounding the own vehicle presence region at the collision timing, is projected onto a side of the own vehicle presence region parallel to an outer side of the collision determination area.

4. The braking control apparatus as set forth in claim 3, wherein
    when the braking operation for the own vehicle is not to be performed, the braking control apparatus performs a notification prompting an acceleration manipulation for the own vehicle, or performs an acceleration operation for the own vehicle.

5. The braking control apparatus as set forth in claim 3, wherein
    the collision range in the own vehicle is represented by values in a one-dimensional coordinate system in which sides of the own vehicle presence region are developed with reference to a predetermined position.

6. The braking control apparatus as set forth in claim 3, wherein
    the braking control apparatus controls the braking operation for the own vehicle to be performed when the calculated collision range in the own vehicle is included in a braking-available range predetermined with respect to the own vehicle presence region, and to be not performed when the calculated collision range in the own vehicle is included only in the braking-unrequired range in the own vehicle.

7. The braking control apparatus as set forth in claim 3, wherein
    the braking control apparatus controls the braking operation for the own vehicle to be performed when a collision range with a distribution is included in a braking-available range predetermined with respect to the own vehicle presence region, and to be not performed when the collision range with the distribution is included only in the braking-unrequired range in the own vehicle,
    the collision range with the distribution being calculated by the braking control apparatus based on an average value and a standard deviation of a plurality of collision ranges in the own vehicle calculated and accumulated by the braking control apparatus.

8. The braking control apparatus as set forth in claim 3, wherein
    the braking control apparatus controls the braking operation for the own vehicle to be performed when at least one of the collision range in the own vehicle and a collision range with a distribution is included in a braking-available range predetermined with respect to the own vehicle presence region, and to be not performed when both the collision range in the own vehicle and the collision range with the distribution are included only in the braking-unrequired range in the own vehicle,
    the collision range with the distribution being calculated by the braking control apparatus based on an average value and a standard deviation of a plurality of collision ranges in the own vehicle calculated and accumulated by the braking control apparatus.

9. The braking control apparatus as set forth in claim 1, wherein
the braking-unrequired range in the own vehicle is a range in which performing the braking operation for the own vehicle actually increases a probability of the predicted collision between the own vehicle and the object.

* * * * *